US012487906B2

(12) United States Patent
Swvigaradoss et al.

(10) Patent No.: US 12,487,906 B2
(45) Date of Patent: Dec. 2, 2025

(54) DISCOVERY AND PREDICTIVE SIMULATION OF SOFTWARE-BASED PROCESSES

(71) Applicant: ServiceNow, Inc., Santa Clara, CA (US)

(72) Inventors: Jebakumar Mathuram Santhosam Swvigaradoss, Hyderabad (IN); Fabio Casati, Santa Clara, CA (US); Manjeet Singh, Santa Clara, CA (US); Daniel Grady, Santa Clara, CA (US)

(73) Assignee: ServiceNow, Inc., Santa Clara, CA (US)

( * ) Notice: Subject to any disclaimer, the term of this patent is extended or adjusted under 35 U.S.C. 154(b) by 265 days.

(21) Appl. No.: 18/086,839

(22) Filed: Dec. 22, 2022

(65) Prior Publication Data
US 2024/0211373 A1   Jun. 27, 2024

(51) Int. Cl.
*G06F 11/3604* (2025.01)
*G06F 11/3668* (2025.01)

(52) U.S. Cl.
CPC ...... *G06F 11/3612* (2013.01); *G06F 11/3692* (2013.01)

(58) Field of Classification Search
CPC .................. G06F 11/3612; G06F 11/3692
See application file for complete search history.

(56) References Cited

U.S. PATENT DOCUMENTS 4,941,084 A   7/1990 Terada et al.
5,185,860 A   2/1993 Wu
(Continued)

FOREIGN PATENT DOCUMENTS

EP   0433979   6/1991
EP   1607824   12/2005
(Continued)

OTHER PUBLICATIONS

Jitendra Kumar et al., "Long Short Term Memory Recurrent Neural Network (LSTM-RNN) Based Workload Forecasting Model For Cloud Datacenters," 2018 [retrieved on Nov. 2, 2024], Procedia Computer Science, vol. 25, 2018, pp. 676-682, downloaded from <url>:https://www.sciencedirect.com. (Year: 2018).*
(Continued)

*Primary Examiner* — S. Sough
*Assistant Examiner* — Stephen D Berman
(74) *Attorney, Agent, or Firm* — MCDONNELL BOEHNEN HULBERT & BERGHOFF LLP

(57) ABSTRACT

An embodiment may involve obtaining a log regarding execution of a software application; obtaining indications of availabilities of resources related to the software application; determining, from the log and the indications of availabilities of the resources, a time series of software application activities; and training a prediction engine with the time series of software application activities, wherein the prediction engine as trained is configured to receive an input time series of further software application activities and generate an output time series that predicts additional software application activities. Another embodiment may involve obtaining an input time series of software application activities, wherein the input time series is based on a log regarding execution of a software application and includes indications of availabilities of resources associated with the software applications; and generating, using a prediction engine, an output time series based on the input time series that predicts additional software application activities.

18 Claims, 17 Drawing Sheets

(56) References Cited

U.S. PATENT DOCUMENTS

| | | |
|---|---|---|
| 5,237,518 A | 8/1993 | Sztipanovits et al. |
| 5,261,097 A | 11/1993 | Saxon |
| 5,265,252 A | 11/1993 | Rawson, III et al. |
| 5,367,685 A | 11/1994 | Gosling |
| 5,390,297 A | 2/1995 | Barber et al. |
| 5,442,791 A | 8/1995 | Wrabetz et al. |
| 5,452,415 A | 9/1995 | Hotka |
| 5,522,042 A | 5/1996 | Fee et al. |
| 5,533,116 A | 7/1996 | Vesterinen |
| 5,655,081 A | 8/1997 | Bonnell et al. |
| 5,659,736 A | 8/1997 | Hasegawa et al. |
| 5,671,412 A | 9/1997 | Christiano |
| 5,696,701 A | 12/1997 | Burgess et al. |
| 5,715,463 A | 2/1998 | Merkin |
| 5,745,879 A | 4/1998 | Wyman |
| 5,761,502 A | 6/1998 | Jacobs |
| 5,764,913 A | 6/1998 | Jancke et al. |
| 5,887,139 A | 3/1999 | Madison, Jr. et al. |
| 5,909,217 A | 6/1999 | Bereiter |
| 5,937,165 A | 8/1999 | Schwaller et al. |
| 5,949,976 A | 9/1999 | Chappelle |
| 5,978,594 A | 11/1999 | Bonnell et al. |
| 6,021,437 A | 2/2000 | Chen et al. |
| 6,041,347 A | 3/2000 | Harsham et al. |
| 6,088,717 A | 7/2000 | Reed et al. |
| 6,101,500 A | 8/2000 | Lau |
| 6,128,016 A | 10/2000 | Coelho et al. |
| 6,131,118 A | 10/2000 | Stupek, Jr. et al. |
| 6,134,581 A | 10/2000 | Ismael et al. |
| 6,138,122 A | 10/2000 | Smith et al. |
| 6,148,335 A | 11/2000 | Haggard et al. |
| 6,166,732 A | 12/2000 | Mitchell et al. |
| 6,167,448 A | 12/2000 | Hemphill et al. |
| 6,175,866 B1 | 1/2001 | Holloway et al. |
| 6,175,878 B1 | 1/2001 | Seaman et al. |
| 6,260,050 B1 | 7/2001 | Yost et al. |
| 6,263,457 B1 | 7/2001 | Anderson et al. |
| 6,272,150 B1 | 8/2001 | Hrastar et al. |
| 6,336,138 B1 | 1/2002 | Caswell et al. |
| 6,363,421 B2 | 3/2002 | Barker et al. |
| 6,393,386 B1 | 5/2002 | Zager et al. |
| 6,397,245 B1 | 5/2002 | Johnson, II et al. |
| 6,434,626 B1 | 8/2002 | Prakash et al. |
| 6,438,592 B1 | 8/2002 | Killian |
| 6,456,306 B1 | 9/2002 | Chin et al. |
| 6,466,932 B1 | 10/2002 | Dennis et al. |
| 6,487,590 B1 | 11/2002 | Foley et al. |
| 6,505,248 B1 | 1/2003 | Casper et al. |
| 6,526,442 B1 | 2/2003 | Stupek, Jr. et al. |
| 6,621,823 B1 | 9/2003 | Mellquist et al. |
| 6,707,795 B1 | 3/2004 | Noorhosseini et al. |
| 6,742,015 B1 | 5/2004 | Bowman-Amuah |
| 6,763,380 B1 | 7/2004 | Mayton et al. |
| 6,816,898 B1 | 11/2004 | Scarpelli et al. |
| 6,895,586 B1 | 5/2005 | Brasher et al. |
| 6,948,175 B1 | 9/2005 | Fong et al. |
| 6,985,901 B1 | 1/2006 | Sachse et al. |
| 7,003,564 B2 | 2/2006 | Greuel et al. |
| 7,028,228 B1 | 4/2006 | Lovy et al. |
| 7,043,537 B1 | 5/2006 | Pratt |
| 7,043,661 B2 | 5/2006 | Valadarsky et al. |
| 7,062,683 B2 | 6/2006 | Warpenburg et al. |
| 7,096,459 B2 | 8/2006 | Keller et al. |
| 7,146,574 B2 | 12/2006 | Goldthwaite et al. |
| 7,197,466 B1 | 3/2007 | Peterson et al. |
| 7,215,360 B2 | 5/2007 | Gupta |
| 7,216,304 B1 | 5/2007 | Gourdol et al. |
| 7,222,147 B1 | 5/2007 | Black et al. |
| 7,281,170 B2 | 10/2007 | Taylor et al. |
| 7,412,502 B2 | 8/2008 | Fearn et al. |
| 7,505,872 B2 | 3/2009 | Keller et al. |
| 7,593,013 B2 | 9/2009 | Agutter et al. |
| 7,596,716 B2 | 9/2009 | Frost et al. |
| 7,617,073 B2 | 11/2009 | Trinon et al. |
| 7,660,731 B2 | 2/2010 | Chaddha et al. |
| 7,676,294 B2 | 3/2010 | Baier et al. |
| 7,676,437 B2 | 3/2010 | Satkunanathan et al. |
| 7,840,490 B1 | 11/2010 | Sellers et al. |
| 7,877,783 B1 | 1/2011 | Cline et al. |
| 7,890,869 B1 | 2/2011 | Mayer et al. |
| 7,966,398 B2 | 6/2011 | Wiles, Jr. |
| 8,060,396 B1 | 11/2011 | Bessler et al. |
| 8,196,210 B2 | 6/2012 | Sterin |
| 8,321,948 B2 | 11/2012 | Robinson et al. |
| 8,407,669 B2 | 3/2013 | Yee et al. |
| 8,554,750 B2 | 10/2013 | Rangarajan et al. |
| 8,595,647 B2 | 11/2013 | Sabin et al. |
| 8,620,818 B2 | 12/2013 | Hughes et al. |
| 8,646,093 B2 | 2/2014 | Myers et al. |
| 8,674,992 B2 | 3/2014 | Poston et al. |
| 8,725,647 B2 | 5/2014 | Disciascio et al. |
| 9,053,460 B2 | 6/2015 | Gilbert et al. |
| 10,673,963 B1 | 6/2020 | Feiguine et al. |
| 10,699,237 B2 | 6/2020 | Singh et al. |
| 10,749,943 B1 | 8/2020 | Feiguine et al. |
| 10,771,344 B2 | 9/2020 | Bitterfeld et al. |
| 10,819,587 B2 | 10/2020 | Singh |
| 10,824,650 B2 | 11/2020 | Bar Oz et al. |
| 10,944,654 B2 | 3/2021 | Rimar et al. |
| 11,089,115 B2 | 8/2021 | Garty et al. |
| 11,095,506 B1 | 8/2021 | Erblat et al. |
| 11,115,432 B2 | 9/2021 | Singh |
| 11,222,290 B2 | 1/2022 | Singh et al. |
| 2002/0116340 A1 | 8/2002 | Hellberg et al. |
| 2002/0133584 A1 | 9/2002 | Greuel et al. |
| 2002/0158969 A1 | 10/2002 | Gupta |
| 2003/0118087 A1 | 6/2003 | Goldthwaite et al. |
| 2003/0200293 A1 | 10/2003 | Fearn et al. |
| 2005/0015217 A1 | 1/2005 | Weidl et al. |
| 2005/0091356 A1 | 4/2005 | Izzo |
| 2006/0026453 A1 | 2/2006 | Frost et al. |
| 2006/0095461 A1 | 5/2006 | Raymond |
| 2006/0179058 A1 | 8/2006 | Bram et al. |
| 2006/0293942 A1 | 12/2006 | Chaddha et al. |
| 2007/0033279 A1 | 2/2007 | Battat et al. |
| 2007/0188494 A1 | 8/2007 | Agutter et al. |
| 2007/0288389 A1 | 12/2007 | Vaughan et al. |
| 2008/0133289 A1 | 6/2008 | Armour et al. |
| 2008/0148253 A1 | 6/2008 | Badwe et al. |
| 2008/0319779 A1 | 12/2008 | Hughes et al. |
| 2009/0088875 A1 | 4/2009 | Baier et al. |
| 2009/0228984 A1 | 9/2009 | Sterin |
| 2010/0110932 A1 | 5/2010 | Doran et al. |
| 2017/0185902 A1* | 6/2017 | Kumar ................ G06N 20/00 |
| 2017/0255945 A1* | 9/2017 | McCord ................ G06N 7/01 |
| 2018/0123940 A1 | 5/2018 | Rimar et al. |
| 2019/0104398 A1 | 4/2019 | Owen et al. |
| 2020/0050689 A1 | 2/2020 | Tal et al. |
| 2020/0204443 A1 | 6/2020 | Bar Oz et al. |
| 2020/0265944 A1* | 8/2020 | Jagannatha ............ G16H 30/40 |
| 2020/0341830 A1* | 10/2020 | Bangad ............ G06F 11/0772 |
| 2020/0379803 A1* | 12/2020 | Saillet ................ G06F 9/4887 |
| 2020/0394462 A1* | 12/2020 | Hild .................... G06F 11/0754 |
| 2022/0308981 A1* | 9/2022 | Zeigen ................ G06N 20/00 |
| 2022/0327397 A1* | 10/2022 | Braviner ................ G06N 5/01 |
| 2023/0117731 A1* | 4/2023 | Mv ...................... G06V 10/95 |
| | | 706/12 |
| 2024/0012875 A1* | 1/2024 | Pal ........................ G06N 7/01 |
| 2024/0045726 A1* | 2/2024 | Leach .................. G06F 9/5083 |

FOREIGN PATENT DOCUMENTS

| | | |
|---|---|---|
| WO | WO 99/34285 | 7/1999 |
| WO | WO 00/52559 | 9/2000 |
| WO | WO 01/79970 | 10/2001 |

OTHER PUBLICATIONS

Ansuman Banerjee et al., "A Framework for Speculative Scheduling and Device Selection for Task Execution on a Mobile Cloud," 2014 [retrieved Apr. 15, 2025], downloaded from <url>:https://link.springer.com/chapter/10.1007/978-3-319-13464-2_4. (Year: 2014).*

(56) References Cited

OTHER PUBLICATIONS

Alok Singh et al., "A Machine Learning Approach for Modular Workflow Performance Prediction," 2017 [retrieved Jul. 17, 2025], Proceedings of the 12th Workshop on Workflows in Support of Large-Scale Science, Article No. 7, pp. 1-11, downloaded from <url>:https://dl.acm.org. (Year: 2017).*
U.S. Appl. No. 17/521,474, filed Nov. 8, 2021.
U.S. Appl. No. 17/837,706, filed Jun. 10, 2022.
Bring Your Digital Twin to Work, Aug. 10, 2021.
How Digital Twins are Changing Work, May 24, 2019.

* cited by examiner

| NUMBER ↙900 | FIELD ↙902 | OLD VALUE ↙904 | NEW VALUE ↙906 | TIMESTAMP ↙908 | RESOURCE ↙910 |
|---|---|---|---|---|---|
| INC0000003 | STATE | NEW | IN PROGRESS | 2022-10-26 12:35:40 | AGENT A |
| INC0000003 | STATE | IN PROGRESS | RESOLVED | 2022-10-26 12:37:10 | AGENT A |
| INC0000004 | STATE | NEW | IN PROGRESS | 2022-10-26 15:02:55 | AGENT B |
| INC0000003 | STATE | RESOLVED | CLOSED | 2022-10-26 21:30:22 | AGENT A |
| INC0000004 | STATE | IN PROGRESS | CANCELLED | 2022-10-26 22:31:32 | AGENT B |

FIG. 9A

| TIME PERIOD ↙920 | NUMBER ↙922 | TYPE ↙924 |
|---|---|---|
| 2022-10-26 00:00.00 – 09:00.00 | 2 | HUMAN AGENT |
| 2022-10-26 09:00.00 – 17:00.00 | 4 | HUMAN AGENT |
| 2022-10-26 17:00.00 – 00:00.00 | 2 | HUMAN AGENT |

FIG. 9B

| NUMBER | FIELD | OLD VALUE | NEW VALUE | TIMESTAMP | RESOURCE | AVAILABLE RESOURCES |
|---|---|---|---|---|---|---|
| INC0000003 | STATE | NEW | IN PROGRESS | 2022-10-26 12:35.40 | AGENT A | AGENTS A, B |
| INC0000003 | STATE | IN PROGRESS | RESOLVED | 2022-10-26 12:37.10 | AGENT A | AGENTS A, B |
| INC0000004 | STATE | NEW | IN PROGRESS | 2022-10-26 15:02.55 | AGENT B | AGENTS A, B |
| INC0000003 | STATE | RESOLVED | CLOSED | 2022-10-26 21:30.22 | AGENT A | AGENTS A, B |
| INC0000004 | STATE | IN PROGRESS | CANCELLED | 2022-10-26 22:31.32 | AGENT B | AGENTS A, B |

FIG. 11A

<NUMBER><FIELD><OLD-VALUE><NEW-VALUE><TIMESTAMP><RESOURCE><AVAILABLE-RESOURCES> ← 1110

<INC0000003><STATE><NEW><IN PROGRESS><2022-10-26 12:35.40><AGENT A><AGENTS A, B> ← 1120
<INC0000003><STATE><IN PROGRESS><RESOLVED><2022-10-26 12:37.10><AGENT A><AGENTS A, B>
<INC0000004><STATE><NEW><IN PROGRESS><2022-10-26 15:02.55><AGENT B><AGENTS A, B>
<INC0000003><STATE><RESOLVED><CLOSED><2022-10-26 21:30.22><AGENT A><AGENTS A, B>
<INC0000004><STATE><IN PROGRESS><CANCELLED><2022-10-26 22:31.32><AGENT B><AGENTS A, B>

FIG. 11B

```
<INC0000003><STATE><NEW><IN PROGRESS><2022-10-26 12:35.40><AGENT A><AGENTS A, B, C>      ← 1150
<INC0000003><STATE><IN PROGRESS><RESOLVED><2022-10-26 12:37.10><AGENT A><AGENTS A, B, C>
<INC0000004><STATE><NEW><IN PROGRESS><2022-10-26 15:02.55><AGENT B><AGENTS A, B, C>
<INC0000003><STATE><RESOLVED><CLOSED><2022-10-26 21:30.22><AGENT A><AGENTS A, B, C>
<INC0000004><STATE><IN PROGRESS><CANCELLED><2022-10-26 22:31.32><AGENT B><AGENTS A, B, C>
```

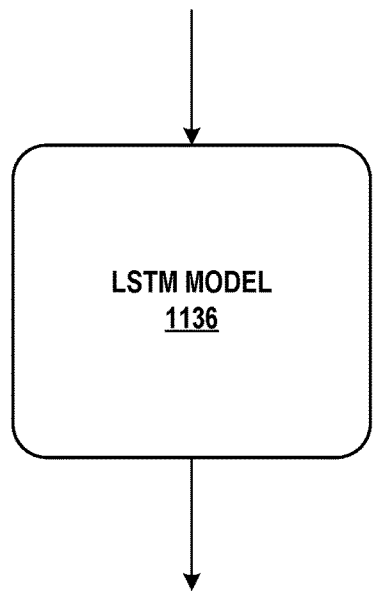

```
<INC0000003><STATE><NEW><IN PROGRESS><2022-10-26 12:35.40><AGENT A><AGENTS A, B, C>      ← 1152
<INC0000003><STATE><IN PROGRESS><RESOLVED><2022-10-26 12:37.10><AGENT A><AGENTS A, B, C>
<INC0000004><STATE><NEW><IN PROGRESS><2022-10-26 15:02.55><AGENT C><AGENTS A, B, C>
<INC0000003><STATE><RESOLVED><CLOSED><2022-10-26 21:30.22><AGENT A><AGENTS A, B, C>
<INC0000004><STATE><IN PROGRESS><CANCELLED><2022-10-26 20:14.52><AGENT C><AGENTS A, B, C>
```
                                                                                          ↑
                                                                                         1154

FIG. 11D

DISCOVERY AND PREDICTIVE SIMULATION OF SOFTWARE-BASED PROCESSES

BACKGROUND

Modern computing platforms support multiple software applications that combine in various ways to provide services to users and/or other computing platforms. These services may involve workflows, and thus can be represented as graphs or state machines. Work items flow through such a workflow in different patterns based on the types of the work items, the state of the computing platform, and the role(s) of any users(s) associated with the work items. Currently, there is no known way of efficiently determining the impact of changing a workflow (e.g., adding, removing, or reordering steps) or the resources it uses.

SUMMARY

The embodiments herein overcome these and other drawbacks by employing machine learning models-such as recurrent neural networks (RNNs)—to predict software application performance in various scenarios. This allows the impact of changing the structure or operation of a workflow, or adding or removing resources available to the workflow, to be estimated without having to incur the cost of actually making these changes.

Accordingly, a first example embodiment may involve obtaining a log regarding execution of a software application on a computing system; obtaining indications of availabilities of resources related to the software application; determining, from the log and the indications of availabilities of the resources, a time series of software application activities; and training a prediction engine with the time series of software application activities, wherein the prediction engine as trained is configured to receive an input time series of further software application activities and generate an output time series that predicts additional software application activities.

A second example embodiment may involve obtaining an input time series of software application activities, wherein the input time series is based on a log regarding execution of a software application and includes indications of availabilities of resources associated with the software applications; and generating, using a prediction engine, an output time series based on the input time series that predicts additional software application activities.

In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 9A depicts workflow log, in accordance with example embodiments.

FIG. 9B depicts a resource schedule, in accordance with example embodiments.

FIG. 11A depicts a time series of workflow log data, in accordance with example embodiments.

FIG. 11B depicts a vector representation of a time series of workflow log data, in accordance with example embodiments.

FIG. 11D depicts input and output of a trained model, in accordance with example embodiments.

DETAILED DESCRIPTION

Figure 1:
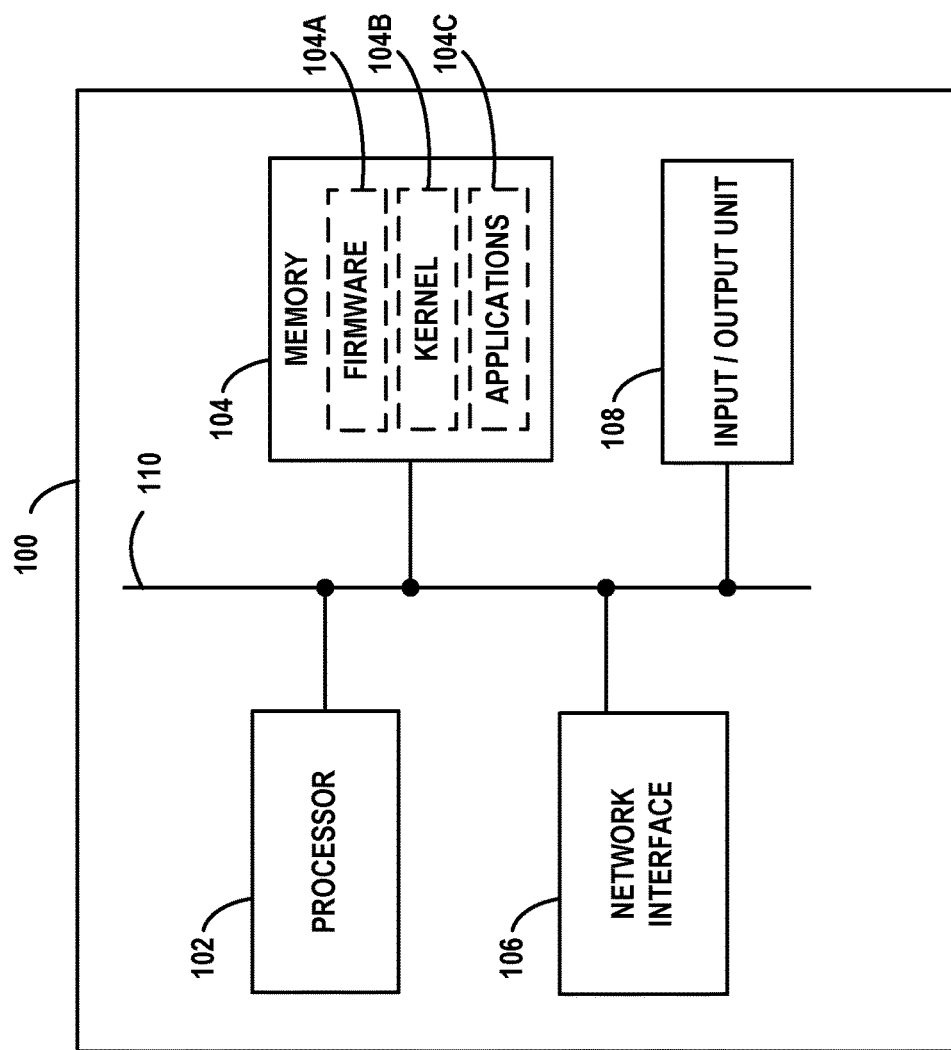
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security. Nonetheless, the embodiments herein are not limited to enterprise applications or environments, and can be more broadly applied.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, and delete (CRUD) capabilities. This allows new applications to be built on a common application infrastructure. In some cases, applications structured differently than MVC, such as those using unidirectional data flow, may be employed.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of predefined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HyperText Markup Language (HTML) and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® bytecode) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
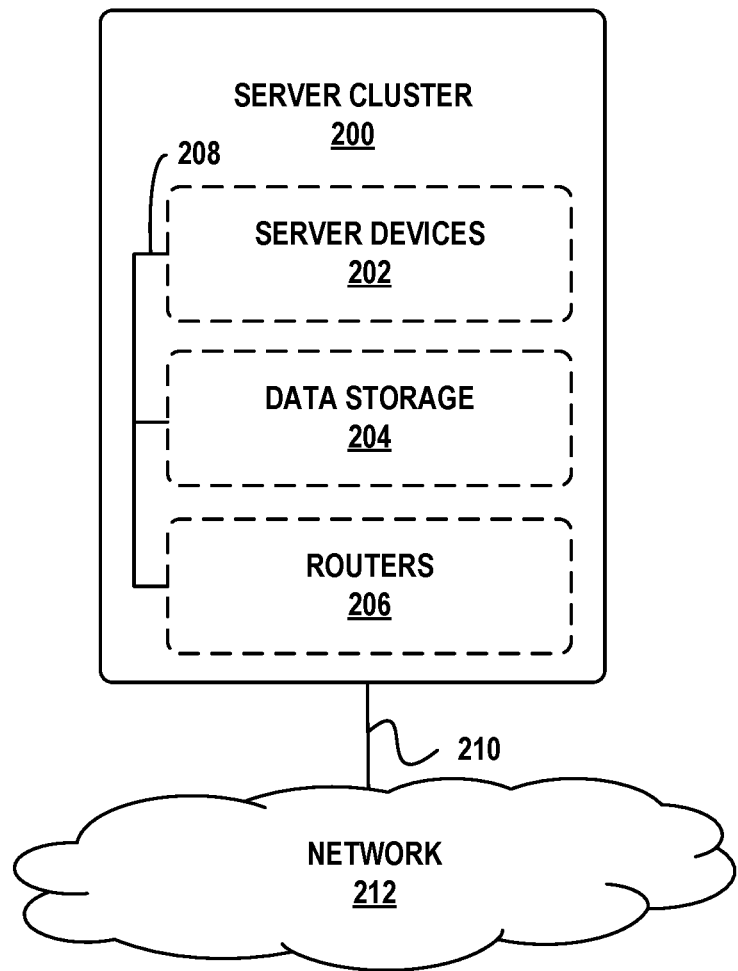
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as HTML, the eXtensible Markup Language (XML), or some other standardized or proprietary format. Moreover, server devices 202 may have the capability of executing various types of computerized scripting languages, such as but not limited to Perl, Python, PHP Hypertext Preprocessor (PUP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. EXAMPLE REMOTE NETWORK MANAGEMENT ARCHITECTURE

Figure 3:
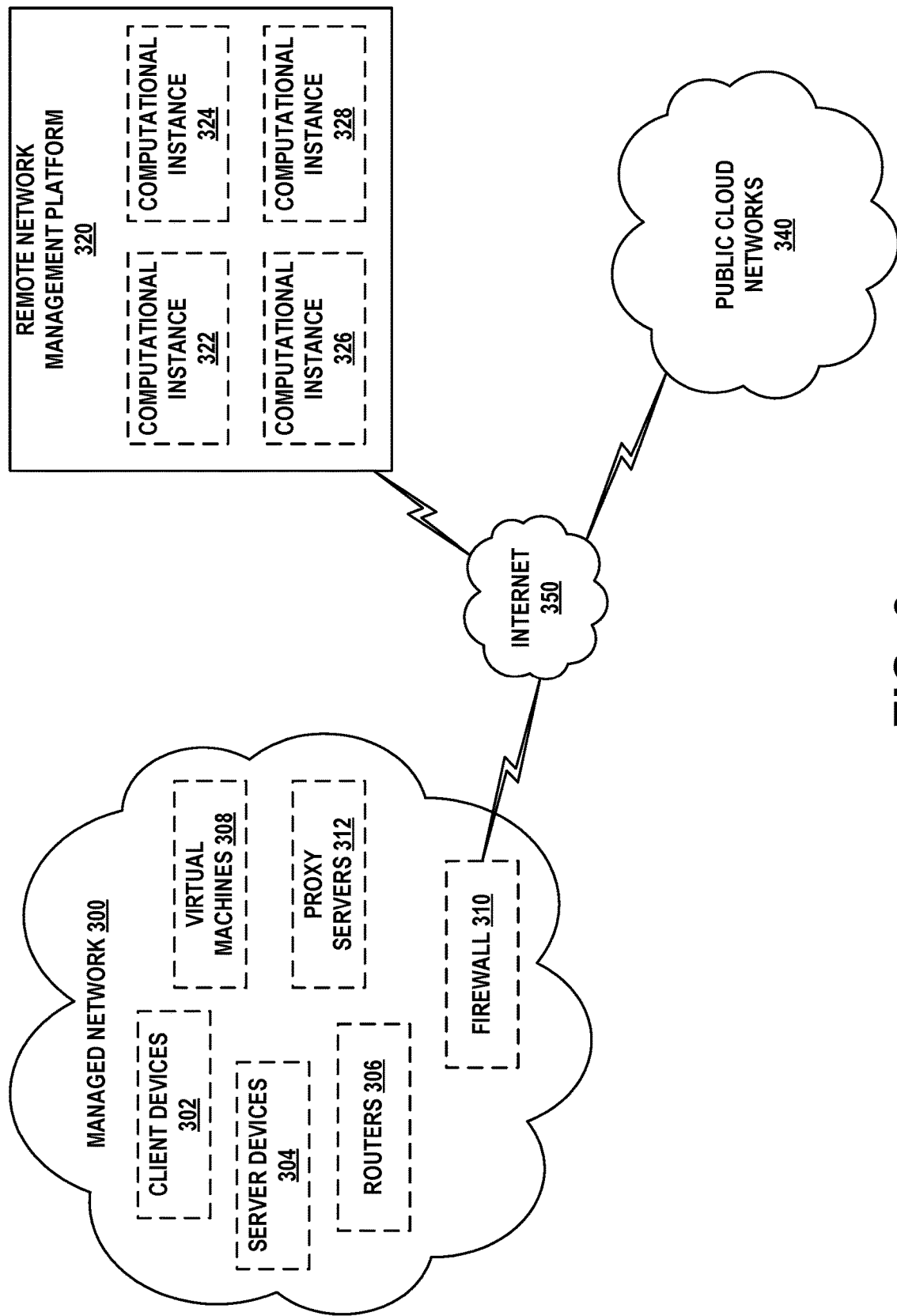
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components.

Possibly with the assistance of proxy servers 312, remote network management platform 320 may also be able to discover and manage aspects of public cloud networks 340 that are used by managed network 300. While not shown in FIG. 3, one or more proxy servers 312 may be placed in any of public cloud networks 340 in order to facilitate this discovery and management.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks. Remote network management platform 320 may also be referred to as a multi-application platform.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may affect all customers' data, creating additional risk, especially for entities subject to governmental, healthcare, and/or financial regulation. Furthermore, any database operations that affect one customer will likely affect all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include AMAZON WEB SERVICES® and MICROSOFT® AZURE®. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
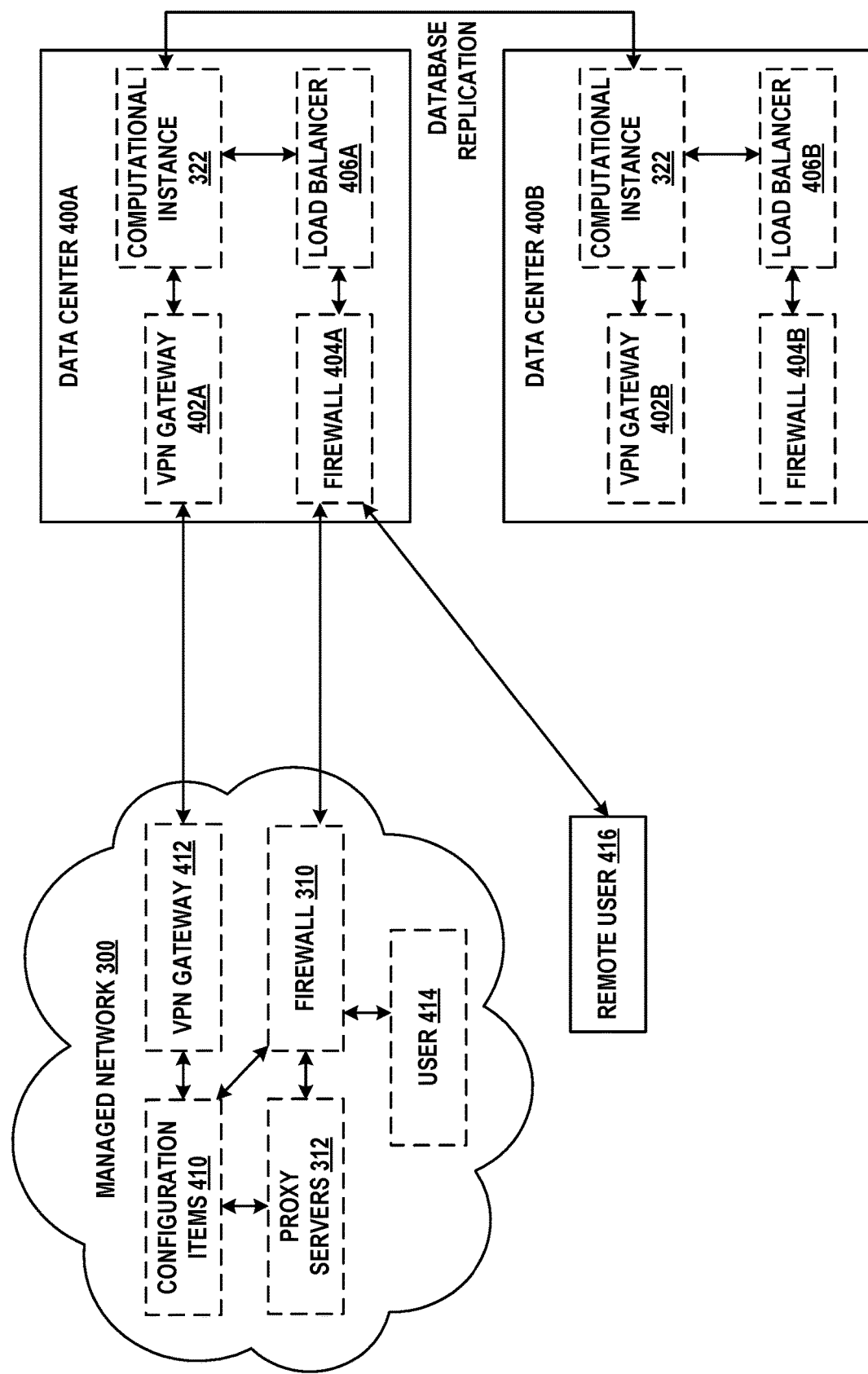
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated, in whole or in part, across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any components thereof, any applications or services executing thereon, as well as relationships between devices, components, applications, and services. Thus, the term "configuration items" may be shorthand for part of all of any physical or virtual device, or any application or service remotely discoverable or managed by computational instance 322, or relationships between discovered devices, applications, and services. Configuration items may be represented in a configuration management database (CMDB) of computational instance 322.

As stored or transmitted, a configuration item may be a list of attributes that characterize the hardware or software that the configuration item represents. These attributes may include manufacturer, vendor, location, owner, unique identifier, description, network address, operational status, serial number, time of last update, and so on. The class of a configuration item may determine which subset of attributes are present for the configuration item (e.g., software and hardware configuration items may have different lists of attributes).

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively). In various alternatives, devices in managed network 300, such as proxy servers 312, may use a secure protocol (e.g., TLS) to communicate directly with one or more data centers.

IV. EXAMPLE DISCOVERY

In order for remote network management platform 320 to administer the devices, applications, and services of managed network 300, remote network management platform 320 may first determine what devices are present in managed network 300, the configurations, constituent components, and operational statuses of these devices, and the applications and services provided by the devices. Remote network management platform 320 may also determine the relationships between discovered devices, their components, applications, and services. Representations of each device, component, application, and service may be referred to as a configuration item. The process of determining the configuration items and relationships within managed network 300 is referred to as discovery, and may be facilitated at least in part by proxy servers 312. Representations of configuration items and relationships are stored in a CMDB.

While this section describes discovery conducted on managed network 300, the same or similar discovery procedures may be used on public cloud networks 340. Thus, in some environments, "discovery" may refer to discovering configuration items and relationships on a managed network and/or one or more public cloud networks.

For purposes of the embodiments herein, an "application" may refer to one or more processes, threads, programs, client software modules, server software modules, or any other software that executes on a device or group of devices. A "service" may refer to a high-level capability provided by one or more applications executing on one or more devices working in conjunction with one another. For example, a web service may involve multiple web application server threads executing on one device and accessing information from a database application that executes on another device.

Figure 5:
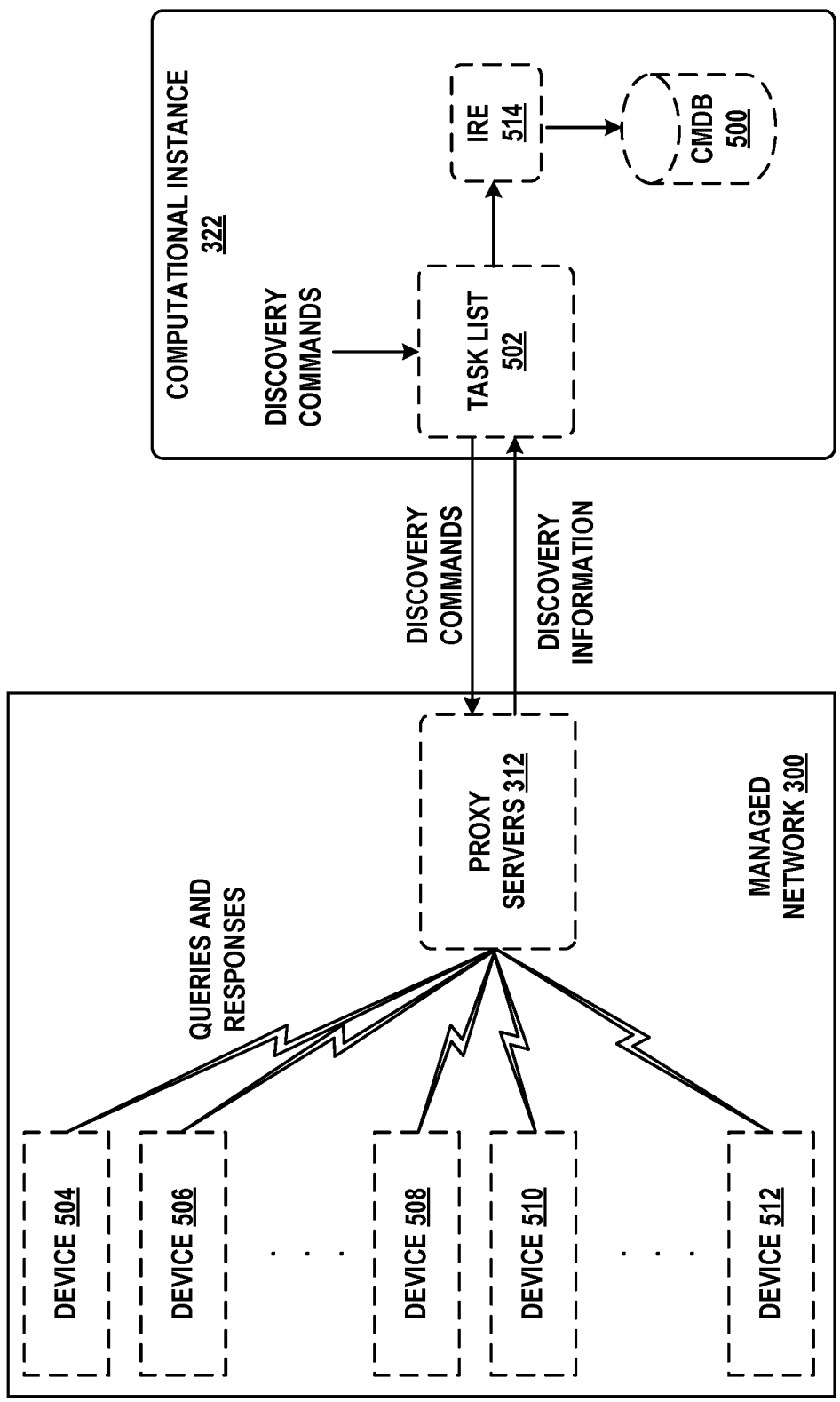
FIG. 5 depicts another communication environment involving a remote network management architecture, in accordance with example embodiments.

FIG. 5 provides a logical depiction of how configuration items and relationships can be discovered, as well as how information related thereto can be stored. For sake of simplicity, remote network management platform 320, public cloud networks 340, and Internet 350 are not shown.

In FIG. 5, CMDB 500, task list 502, and identification and reconciliation engine (IRE) 514 are disposed and/or operate within computational instance 322. Task list 502 represents a connection point between computational instance 322 and proxy servers 312. Task list 502 may be referred to as a queue, or more particularly as an external communication channel (ECC) queue. Task list 502 may represent not only the queue itself but any associated processing, such as adding, removing, and/or manipulating information in the queue.

As discovery takes place, computational instance 322 may store discovery tasks (jobs) that proxy servers 312 are to perform in task list 502, until proxy servers 312 request these tasks in batches of one or more. Placing the tasks in task list 502 may trigger or otherwise cause proxy servers 312 to begin their discovery operations. For example, proxy servers 312 may poll task list 502 periodically or from time to time, or may be notified of discovery commands in task list 502 in some other fashion. Alternatively or additionally, discovery may be manually triggered or automatically triggered based on triggering events (e.g., discovery may automatically begin once per day at a particular time).

Regardless, computational instance 322 may transmit these discovery commands to proxy servers 312 upon request. For example, proxy servers 312 may repeatedly query task list 502, obtain the next task therein, and perform this task until task list 502 is empty or another stopping condition has been reached. In response to receiving a discovery command, proxy servers 312 may query various devices, components, applications, and/or services in managed network 300 (represented for sake of simplicity in FIG. 5 by devices 504, 506, 508, 510, and 512). These devices, components, applications, and/or services may provide responses relating to their configuration, operation, and/or status to proxy servers 312. In turn, proxy servers 312 may then provide this discovered information to task list 502 (i.e., task list 502 may have an outgoing queue for holding discovery commands until requested by proxy servers 312 as well as an incoming queue for holding the discovery information until it is read).

IRE 514 may be a software module that removes discovery information from task list 502 and formulates this discovery information into configuration items (e.g., representing devices, components, applications, and/or services discovered on managed network 300) as well as relationships therebetween. Then, IRE 514 may provide these configuration items and relationships to CMDB 500 for storage therein. The operation of IRE 514 is described in more detail below.

In this fashion, configuration items stored in CMDB 500 represent the environment of managed network 300. As an example, these configuration items may represent a set of physical and/or virtual devices (e.g., client devices, server devices, routers, or virtual machines), applications executing thereon (e.g., web servers, email servers, databases, or storage arrays), as well as services that involve multiple individual configuration items. Relationships may be pairwise definitions of arrangements or dependencies between configuration items.

In order for discovery to take place in the manner described above, proxy servers 312, CMDB 500, and/or one or more credential stores may be configured with credentials for the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

There are two general types of discovery—horizontal and vertical (top-down). Each are discussed below.

A. Horizontal Discovery

Horizontal discovery is used to scan managed network 300, find devices, components, and/or applications, and then populate CMDB 500 with configuration items representing these devices, components, and/or applications. Horizontal discovery also creates relationships between the configuration items. For instance, this could be a "runs on" relationship between a configuration item representing a software application and a configuration item representing a server device on which it executes. Typically, horizontal discovery is not aware of services and does not create relationships between configuration items based on the services in which they operate.

There are two versions of horizontal discovery. One relies on probes and sensors, while the other also employs patterns. Probes and sensors may be scripts (e.g., written in JAVASCRIPT®) that collect and process discovery information on a device and then update CMDB 500 accordingly. More specifically, probes explore or investigate devices on managed network 300, and sensors parse the discovery information returned from the probes.

Patterns are also scripts that collect data on one or more devices, process it, and update the CMDB. Patterns differ from probes and sensors in that they are written in a specific discovery programming language and are used to conduct detailed discovery procedures on specific devices, components, and/or applications that often cannot be reliably discovered (or discovered at all) by more general probes and sensors. Particularly, patterns may specify a series of operations that define how to discover a particular arrangement of devices, components, and/or applications, what credentials to use, and which CMDB tables to populate with configuration items resulting from this discovery.

Both versions may proceed in four logical phases: scanning, classification, identification, and exploration. Also, both versions may require specification of one or more ranges of IP addresses on managed network 300 for which discovery is to take place. Each phase may involve communication between devices on managed network 300 and proxy servers 312, as well as between proxy servers 312 and task list 502. Some phases may involve storing partial or preliminary configuration items in CMDB 500, which may be updated in a later phase.

In the scanning phase, proxy servers 312 may probe each IP address in the specified range(s) of IP addresses for open Transmission Control Protocol (TCP) and/or User Datagram Protocol (UDP) ports to determine the general type of device and its operating system. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist.

In the classification phase, proxy servers 312 may further probe each discovered device to determine the type of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the specific type of operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 10, as a set of WINDOWS®-10-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500 along with any relevant relationships therebetween. Doing so may involve passing the identification information through IRE 514 to avoid generation of duplicate configuration items, for purposes of disambiguation, and/or to determine the table(s) of CMDB 500 in which the discovery information should be written.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (software applications), and so on. Once more, the discovered information may be stored as one or more configuration items in CMDB 500, as well as relationships.

Running horizontal discovery on certain devices, such as switches and routers, may utilize SNMP. Instead of or in addition to determining a list of running processes or other application-related information, discovery may determine additional subnets known to a router and the operational state of the router's network interfaces (e.g., active, inactive, queue length, number of packets dropped, etc.). The IP addresses of the additional subnets may be candidates for further discovery procedures. Thus, horizontal discovery may progress iteratively or recursively.

Patterns are used only during the identification and exploration phases—under pattern-based discovery, the scanning and classification phases operate as they would if probes and sensors are used. After the classification stage completes, a pattern probe is specified as a probe to use during identification. Then, the pattern probe and the pattern that it specifies are launched.

Patterns support a number of features, by way of the discovery programming language, that are not available or difficult to achieve with discovery using probes and sensors. For example, discovery of devices, components, and/or applications in public cloud networks, as well as configuration file tracking, is much simpler to achieve using pattern-based discovery. Further, these patterns are more easily customized by users than probes and sensors. Additionally, patterns are more focused on specific devices, components, and/or applications and therefore may execute faster than the more general approaches used by probes and sensors.

Once horizontal discovery completes, a configuration item representation of each discovered device, component, and/or application is available in CMDB 500. For example, after discovery, operating system version, hardware configuration, and network configuration details for client devices, server devices, and routers in managed network 300, as well as applications executing thereon, may be stored as configuration items. This collected information may be presented to a user in various ways to allow the user to view the hardware composition and operational status of devices.

Furthermore, CMDB 500 may include entries regarding the relationships between configuration items. More specifically, suppose that a server device includes a number of hardware components (e.g., processors, memory, network interfaces, storage, and file systems), and has several software applications installed or executing thereon. Relationships between the components and the server device (e.g., "contained by" relationships) and relationships between the software applications and the server device (e.g., "runs on" relationships) may be represented as such in CMDB 500.

More generally, the relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

In this manner, remote network management platform 320 may discover and inventory the hardware and software deployed on and provided by managed network 300.

B. Vertical Discovery

Vertical discovery is a technique used to find and map configuration items that are part of an overall service, such as a web service. For example, vertical discovery can map a web service by showing the relationships between a web server application, a LINUX® server device, and a database that stores the data for the web service. Typically, horizontal discovery is run first to find configuration items and basic relationships therebetween, and then vertical discovery is run to establish the relationships between configuration items that make up a service.

Patterns can be used to discover certain types of services, as these patterns can be programmed to look for specific arrangements of hardware and software that fit a description of how the service is deployed. Alternatively or additionally, traffic analysis (e.g., examining network traffic between devices) can be used to facilitate vertical discovery. In some cases, the parameters of a service can be manually configured to assist vertical discovery.

In general, vertical discovery seeks to find specific types of relationships between devices, components, and/or applications. Some of these relationships may be inferred from configuration files. For example, the configuration file of a web server application can refer to the IP address and port number of a database on which it relies. Vertical discovery patterns can be programmed to look for such references and infer relationships therefrom. Relationships can also be inferred from traffic between devices—for instance, if there is a large extent of web traffic (e.g., TCP port 80 or 8080) traveling between a load balancer and a device hosting a web server, then the load balancer and the web server may have a relationship.

Relationships found by vertical discovery may take various forms. As an example, an email service may include an email server software configuration item and a database application software configuration item, each installed on different hardware device configuration items. The email service may have a "depends on" relationship with both of these software configuration items, while the software configuration items have a "used by" reciprocal relationship with the email service. Such services might not be able to be fully determined by horizontal discovery procedures, and instead may rely on vertical discovery and possibly some extent of manual configuration.

C. Advantages of Discovery

Regardless of how discovery information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

In another example, suppose that a database application is executing on a server device, and that this database application is used by an employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular hardware device fails.

In general, configuration items and/or relationships between configuration items may be displayed on a web-based interface and represented in a hierarchical fashion. Modifications to such configuration items and/or relationships in the CMDB may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

V. CMDB IDENTIFICATION RULES AND RECONCILIATION

A CMDB, such as CMDB 500, provides a repository of configuration items and relationships. When properly provisioned, it can take on a key role in higher-layer applications deployed within or involving a computational instance. These applications may relate to enterprise IT service management, operations management, asset management, configuration management, compliance, and so on.

For example, an IT service management application may use information in the CMDB to determine applications and services that may be impacted by a component (e.g., a server device) that has malfunctioned, crashed, or is heavily loaded. Likewise, an asset management application may use information in the CMDB to determine which hardware and/or software components are being used to support particular enterprise applications. As a consequence of the importance of the CMDB, it is desirable for the information stored therein to be accurate, consistent, and up to date.

A CMDB may be populated in various ways. As discussed above, a discovery procedure may automatically store information including configuration items and relationships in the CMDB. However, a CMDB can also be populated, as a whole or in part, by manual entry, configuration files, and third-party data sources. Given that multiple data sources may be able to update the CMDB at any time, it is possible that one data source may overwrite entries of another data source. Also, two data sources may each create slightly different entries for the same configuration item, resulting in a CMDB containing duplicate data. When either of these occurrences takes place, they can cause the health and utility of the CMDB to be reduced.

In order to mitigate this situation, these data sources might not write configuration items directly to the CMDB. Instead, they may write to an identification and reconciliation application programming interface (API) of IRE 514. Then, IRE 514 may use a set of configurable identification rules to uniquely identify configuration items and determine whether and how they are to be written to the CMDB.

In general, an identification rule specifies a set of configuration item attributes that can be used for this unique identification. Identification rules may also have priorities so that rules with higher priorities are considered before rules with lower priorities. Additionally, a rule may be independent, in that the rule identifies configuration items independently of other configuration items. Alternatively, the rule may be dependent, in that the rule first uses a metadata rule to identify a dependent configuration item.

Metadata rules describe which other configuration items are contained within a particular configuration item, or the host on which a particular configuration item is deployed. For example, a network directory service configuration item may contain a domain controller configuration item, while a web server application configuration item may be hosted on a server device configuration item.

A goal of each identification rule is to use a combination of attributes that can unambiguously distinguish a configuration item from all other configuration items, and is expected not to change during the lifetime of the configuration item. Some possible attributes for an example server device may include serial number, location, operating system, operating system version, memory capacity, and so on. If a rule specifies attributes that do not uniquely identify the configuration item, then multiple components may be represented as the same configuration item in the CMDB. Also, if a rule specifies attributes that change for a particular configuration item, duplicate configuration items may be created.

Thus, when a data source provides information regarding a configuration item to IRE 514, IRE 514 may attempt to match the information with one or more rules. If a match is found, the configuration item is written to the CMDB or updated if it already exists within the CMDB. If a match is not found, the configuration item may be held for further analysis.

Configuration item reconciliation procedures may be used to ensure that only authoritative data sources are allowed to overwrite configuration item data in the CMDB. This reconciliation may also be rules-based. For instance, a reconciliation rule may specify that a particular data source is authoritative for a particular configuration item type and set of attributes. Then, IRE 514 might only permit this authoritative data source to write to the particular configuration item, and writes from unauthorized data sources may be prevented. Thus, the authorized data source becomes the single source of truth regarding the particular configuration item. In some cases, an unauthorized data source may be allowed to write to a configuration item if it is creating the configuration item or the attributes to which it is writing are empty.

Additionally, multiple data sources may be authoritative for the same configuration item or attributes thereof. To avoid ambiguities, these data sources may be assigned precedences that are taken into account during the writing of configuration items. For example, a secondary authorized data source may be able to write to a configuration item's attribute until a primary authorized data source writes to this attribute. Afterward, further writes to the attribute by the secondary authorized data source may be prevented.

In some cases, duplicate configuration items may be automatically detected by IRE 514 or in another fashion. These configuration items may be deleted or flagged for manual de-duplication.

VI. WORKFLOWS

The infrastructure of remote network management platform 320 may be used to facilitate workflows. A workflow may be represented, for example, by a directed graph that has one or more starting and one or more ending nodes. As a work item flows through a workflow, the work item may change states based on transitions (edges) between nodes of the graph (i.e., the nodes may represent the possible states of the work item).

Figure 6A:
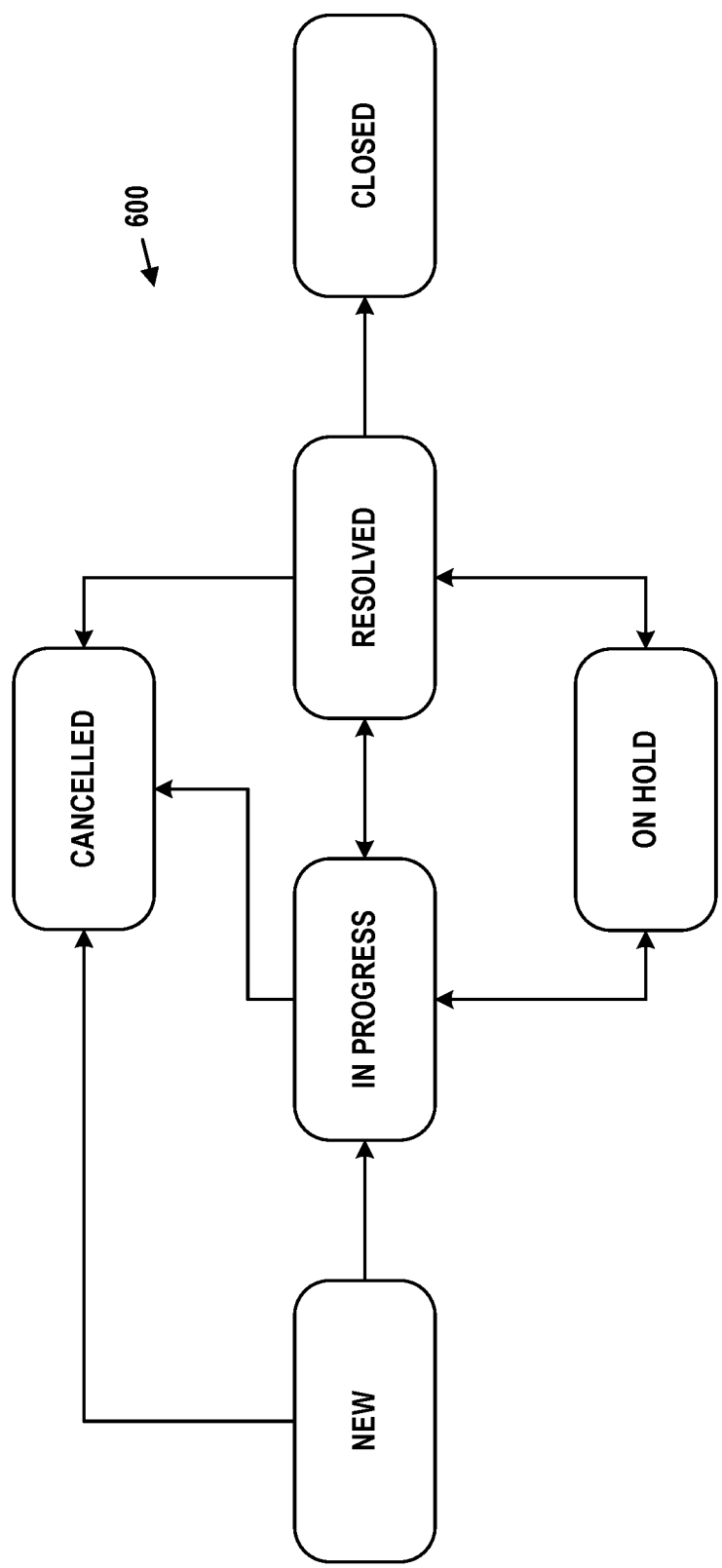
FIG. 6A is a graph depicting a workflow, in accordance with example embodiments.

FIG. 6A depicts an example workflow 600, in which the boxes (nodes) represent discrete states and the arrows between these states represent transitions. This workflow represents that of an IT incident. Such an incident may be created by a technology user who has encountered a problem (e.g., an application not working properly on their laptop, a network service that is not reachable) or automatically generated when an outage is detected. Each incident may progress through this workflow from the new state to either the cancelled state or the closed state. The incident may be assigned to a human or virtual agent who is tasked with addressing the incident.

The states can be defined as follows. In the new state, the incident has been created but not yet investigated. In the in progress state, the incident has been assigned to an agent, and is being investigated or is scheduled for investigation. In the on hold state, the responsibility for the incident shifts temporarily from the assigned to another entity (e.g., the user or another agent) to provide further information, evidence, or a resolution. In the resolved state, the incident has been addressed by the agent. In the closed state, the incident has been confirmed to be satisfactorily resolved. In the cancelled state, the incident was examined but found to be a duplicate incident, an unnecessary incident, or not representing an actual problem.

Workflow 600 is just one possible incident management workflow. Other such workflows involving more or fewer states and/or transitions may be possible. Workflow 600 also serves to represent more complicated workflows that go beyond just incident management.

Data related to each work item that is processed by a workflow may be logged, saved, or otherwise stored by the computational instance hosting the workflow. For example, data related to the states and transitions used by each work item, how much time each work item stays in each state, the user or users associated with each work item, and so on may be written to one or more logs. These logs may exist as files in a filesystem, entries in a database, or in some other form.

Such logs can later be mined for information regarding how the workflow is carried out in practice. This data mining can be used to identify bottlenecks and other inefficiencies in a workflow that are areas in which improvements to the workflow could possibly be made. In some embodiments, scripts on the computational instance could be automatically executed on demand or periodically to process the logs and output a representation of operational aspects of the workflow and/or one or more of its inefficiencies. For example, such scripts might determine the average amount of time that work items spend in each state, the average amount of time between creation of a new incident and it being closed or cancelled, the empirical probabilities of each transition being taken, and so on.

Figure 6B:
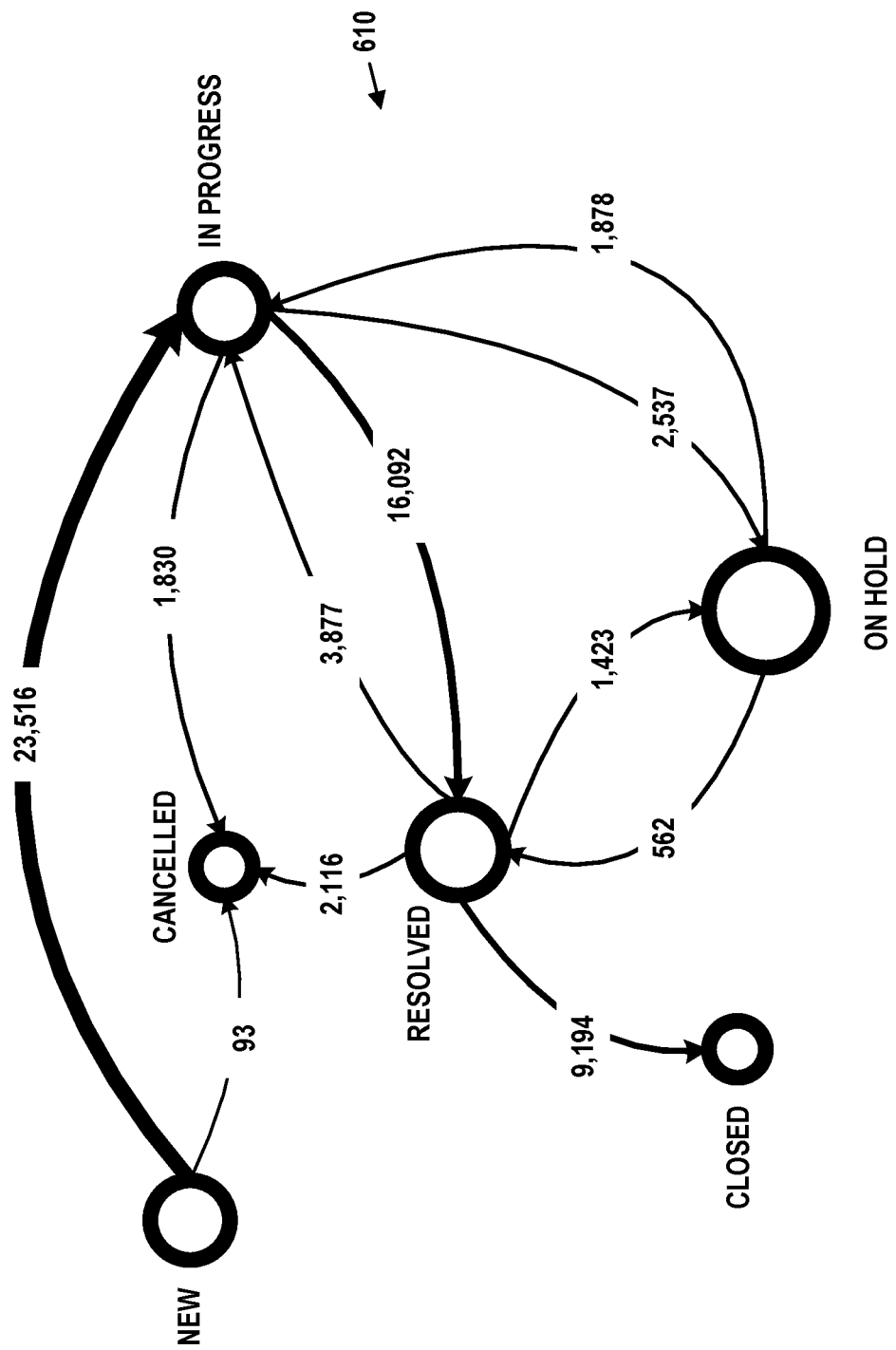
FIG. 6B is a state-occupancy diagram, in accordance with example embodiments.

To that point, FIG. 6B depicts state-occupancy diagram 610 for example executions of workflow 600. A state-occupancy analysis of a workflow may be carried out by the computational instance in response to a request from a user, such as a workflow analyst. The computational instance may parse the logs for the workflow, select a plurality of entries, and determine a historical distribution of work items among states of the workflow. The distribution may also account for transitions between states, thereby enabling transition rates between states to be derived.

The computational instance may generate a graphical representation of this distribution, such as that of state-occupancy diagram 610, and then transmit the generated graphical representation to a computing device of the requesting user. With this visual information, the user may troubleshoot the incident management workflow, and/or explore possible improvements to the workflow, for example.

In state-occupancy diagram 610, each state is represented graphically as a circle corresponding to a node. The size of each node may correspond to the occupancy of the associated state (e.g., the number of work items in each state at a given point in time). Transitions between states are shown as directed arrows, where the thickness of the each arrow's line corresponds to the number of transitions. The number of transitions is also indicated for each arrow. In state-occupancy diagram 610, the on hold state appears to have the largest occupancy, and the largest number of transitions is from the new state to the in progress state.

The occupancy of states and numbers of particular state transitions may be determined by a statistical analysis involving time-averaging over states and over specified time windows. Transition rates may also be derived from the numbers of transitions and the specified time windows.

A process analyst or other entity may inspect the data in the logs representing state occupancy, or the visual representation of state-occupancy diagram 610 to determine workflow inefficiencies. Example inefficiencies may include a large number of work items in a particular state (e.g., the on hold state of state-occupancy diagram 610 being heavily occupied), transitions representing a longer path taken through state-occupancy diagram 610 for a large number of work items, or work items "ping-ponging" in a cycle of two or more states. In some cases, the user interface presented may allow drilling down into the raw data from the logs and/or determining other factors associated with a workflow (e.g., the agents assigned to the largest number of incidents in the on hold state).

From the logs and/or state-occupancy diagram 610, process improvement recommendations can be made. Such recommendations may include suggestions of workflow states or transitions that can be automated, workflow states or transitions that can be removed, agents who could benefit from training, new software tools that could be employed to improve the workflow, and so on.

Modern organizations typically contend with complex, multi-workflow environments. For instance, an incident management workflow may be integrated in some fashion with change request, problem, and/or task workflows. A problem may identify an underlying root cause to one or more incidents. Change requests or tasks may be assigned to individuals whose job it is to address problems and/or incidents. Each of these workflows may have different procedures, and therefore different states and different state-occupancy diagrams. These workflows may be linked to one another in various ways. Further, each workflow may have one or more sub-workflows that are invoked at least for some work items.

Further, each workflow may be represented by its own database of work items and/or events. The work items may be representations of an execution of the procedure, and events may be log data relating to the progress of work items through the procedure (e.g., times of state transitions, input and output values when in states or upon transitions, etc.).

This adds up to a computational environment in which there may be complex dependencies between a number of workflows. This makes predicting the impact of a change to any one workflow difficult to do at all, much less in a reasonably accurate manner.

In addition to these issues, the performance of workflows may also depend on the number of available resources that can be applied to various states in the workflows. In the example of FIGS. 6A and 6B, these might be human and/or virtual agents that are assigned to incidents in the in progress state of FIG. 6A. In general, the more resources available, the more likely the workflow can be performed in an appropriate fashion. However, many workflows have a point of diminishing return, after which assigning more resources has little or no impact. For example, if the average number of incidents "in progress" is 5, having more than 5 agents to assign to incidents may result on one or more of these agents being idle a great deal of time.

Further, these resources may be available in accordance with a schedule. For instance, more agents may be available from 9 am-5 pm weekdays than from 5 pm-9 am weekdays, and some agents may take certain days off in predictable or unpredictable patterns.

Figure 7:
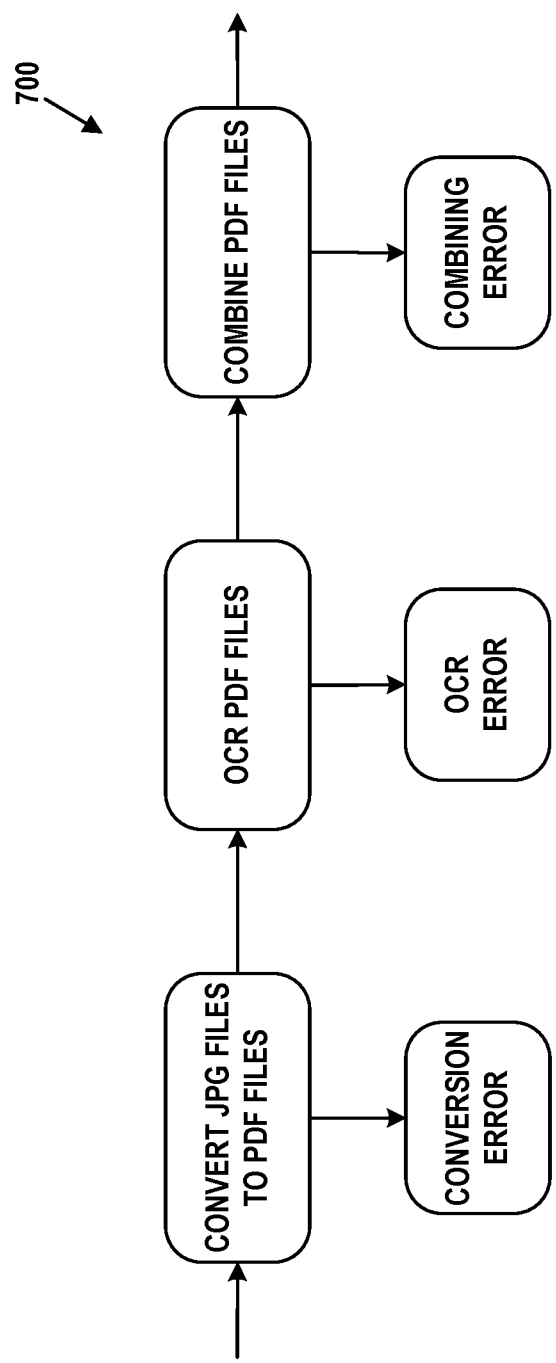
FIG. 7 is a graph depicting another workflow, in accordance with example embodiments.

Another example workflow 700 is depicted in FIG. 7. This workflow involves an automated document scanning process in which a number of pages of a document are scanned to JPG format, one JPG file per page. The JPG files associated with a particular document are stored in a dedicated directory of a filesystem and are assumed to be named in accordance with their page numbers from the document (e.g., "page0001.jpg", "page0002.jpg", "page0003.jpg", etc.).

It is desirable to combine these individually-scanned pages into a single, searchable PDF file of the document, the PDF file containing all pages in order of their numbers. Accordingly, workflow 700 has three main states. First, each of the individual JPG files are converted to individual PDF files. Second, optical character recognition (OCR) is applied to each PDF file, rending that file searchable. Third, the OCR'ed PDF files are combined in page numbered order into a single PDF file. During each of these states, an error may occur, resulting in the workflow failing to complete. Thus, the first, second, and third states may be respectively associated with a conversion error state, an OCR error state, and a combining error state.

Workflow 700 may benefit from parallelism (e.g., having more than one thread of execution and/or more than one processor operating in parallel in at least some steps. For instance, a process analyst might discover that the second state (applying OCR to each file) takes on average 80% of the overall time spent on the workflow for a set of example documents. Through trial and error, the process analyst may determine that using two threads of execution for OCR procedures reduces time spent in the state by 40%, using three threads reduces time spent in the state by 60%, using four threads reduces time spent in the state by 70%, and using five threads reduces time spent in the state by 72%. The reason for these diminished returns might be that main memory capacity or data transfer overhead become bottlenecks as the number of threads increases. Based on these tests and observations, the process analyst might decide to use three threads for OCR procedures.

Further, the process analyst might also determine, again through trial and error, that approximately 50% of all errors that halt the workflow are generated in the state in which the individual PDF files are combined. Investigating further, the process analyst might find that the software application being used to combine the PDF files is not robust in a number of scenarios. Thus, the process analyst might recommend that this software application be replaced.

Again, workflow 700 is just a simple example. Workflows in practice may be more complex with a multitude of influencing factors. Thus, the trial and error approach discussed above may be completely unworkable for anything but a small handful of workflows.

VII. WORKFLOW IMPROVEMENT THROUGH AUTOMATED DISCOVERY AND SIMULATION

As can be gathered from the discussion above, there can be at least three different causes for workflow inefficiencies: problems with the workflow's structure, problems with resources assigned to carry out the workflow, or problems with software used in various states of the workflow. Problems with the workflow's structure might be too many states, unintended loops, and missing transitions. Problems with resources might be (depending on context), a lack of human agent resources or a lack of computational resources. Computational resources might include virtual agents, threads, processors, memory, communication capacity, and so on. Problems with software might be software applications that are used by one or more states or transitions of the workflow being unreliable, exhibiting defects, or otherwise being unsuitable for their intended tasks.

The embodiments herein overcome these and potentially other challenges or impediments to workflow improvement by automatically discovering workflows, enhancing logs that record workflow operations with realistic synthetic entries, and then simulating the performance of the workflows. The outcome of such simulation may help identify inefficiencies, delays, or bottlenecks in workflows that otherwise would be virtually impossible to identify.

Figure 8:
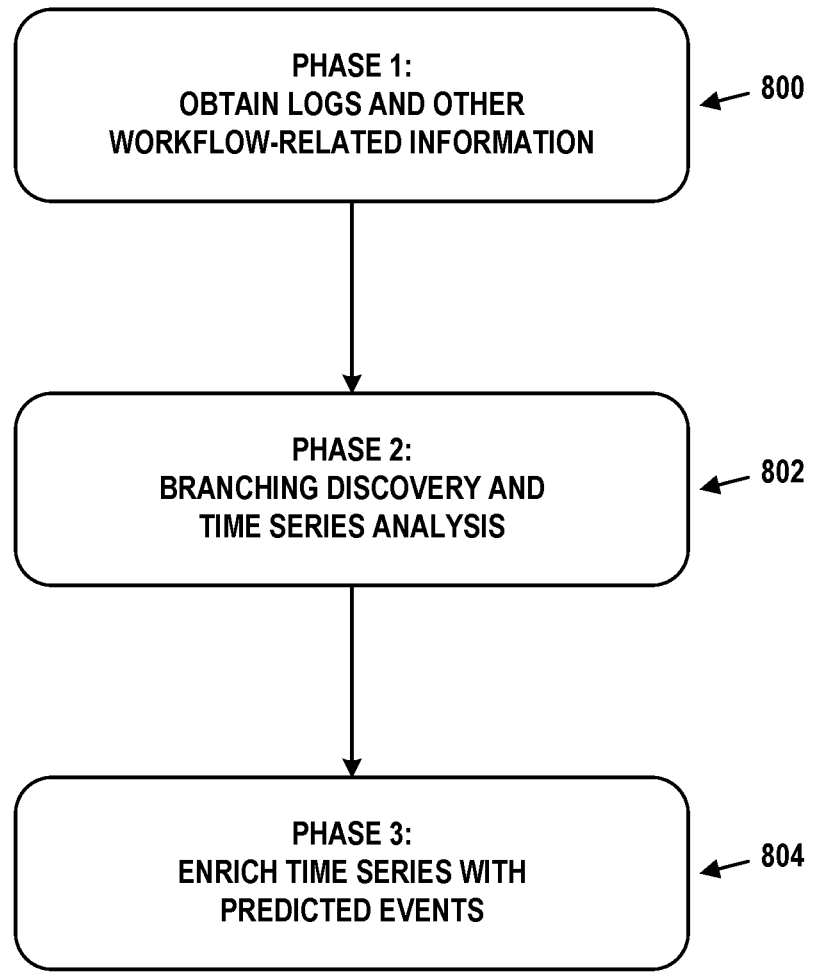
FIG. 8 depicts three phases of processing, in accordance with example embodiments.

In possible embodiments, there may be three phases to these procedures, as depicted in FIG. 8. In a first block 800 (phase 1), the workflow logs and other workflow-related information are obtained. In a second block 802 (phase 2), branching discovery and time series analysis are applied to the workflow logs and the other workflow-related information to determine transition probabilities and resource impact, respectively. In a third block 804 (phase 3), a machine learning model is trained from the workflow logs, transition probabilities, and resource availability. This trained model can then be used to generate synthetic logs that explore various scenarios that might not be fully-represented in the workflow logs. These "what-if" scenarios can be used to infer, for example, the impact on modifying the structure of the workflow, the resources assigned to the workflow, and/or the software used to facilitate the workflow.

Notably, these three phases are presented for purposes of convenience. The operations of the embodiments herein could use more or fewer phases.

A. Phase 1

As noted above, phase 1 may involve obtaining workflow logs and other workflow-related information. An example workflow log 900 is depicted in FIG. 9A. Workflow log 900 corresponds to workflow 600 of FIG. 6A, and contains a number of entries representing state transitions of work items as they traverse workflow 600.

Each entry includes a number (e.g., an incident number) that uniquely identifies a work item, a field that has changed, the old value of the field, the new value of the field, and a timestamp of when the change took place. If multiple fields of a work item are changed in the same operation, there may be one entry per changed field in workflow log 900.

As an example, in entry 902, the state of incident INC0000003 changed from new to in progress. In entry 904, the state of incident INC0000003 changed from in progress to resolved. In entry 908, the state of incident INC0000003 changed from resolved to closed. As another example, in entry 906, the state of incident INC0000004 changed from new to in progress. In entry 910, the state of incident INC0000004 changed from in progress to cancelled.

In all of these entries, the resource assigned to the incident INC0000003 is agent A and the resource assigned to incident INC0000004 is agent B. In some scenarios, an incident can be reassigned to a different agent one or more times before it is closed or cancelled.

Workflow log 900 may include hundreds, or thousands of these entries, or possibly many more than that. These entries may be chronologically ordered, and thus the state change entries involving multiple incidents may be interleaved in some fashion, like those shown in FIG. 9A.

In addition to workflow logs, other workflow-related information may be obtained in phase 1. This information may include, but is not limited to, resource availability and software tools employed by the workflow or human users in various states of the workflow. The resource availability may indicate the number and/or type of resources (e.g., human agents and/or computational resources) that were available to carry out the workflow during the time period in which the workflow logs were recorded. This availability may be indicated by a number, type, and/or schedule of such resources.

An example is shown in resource schedule 920 of FIG. 9B. Resource schedule 920 indicates the number and type of resources that were available during various time periods in which entries were written to workflow log 900. Particularly, on Oct. 26, 2022, from 12 midnight to 9 am, two human agents were available as indicated by entry 922. On Oct. 26, 2022, from 9 am to 5 pm, four human agents were available as indicated by entry 924. On Oct. 26, 2022, from 5 pm to midnight, two human agents were available as indicated by entry 926. In some cases, particular agents may be identified by name, number, or an anonymized identifier.

Resource schedule 920 may repeat across multiple days, and may also take on different patterns on weekends and holidays to reflect increased or decreased demand. Thus, resource schedule 920 depicts just one day of a schedule that could be much longer or more complicated.

Nonetheless, workflow log 900 and resource schedule 920 could be integrated in various ways into a single log or data structure. For example, transitions in the number and type of resources available from resource schedule 920 might be listed as entries in workflow log 900. Such annotation provides further information so that workflow logs can be accurately predicted and/or simulated (see below).

Where appropriate, resource schedule 920 might also include the availability of computational resources, such as processors, virtual machines, memory, and so on. For instance, a service that relies on a public cloud network for computation might employ computational resources that vary over time (e.g., more virtual machines are available during the week than on weekends). Thus, resource schedule 920 could represent the availability of human resources, computational resources, or both.

In some cases, if the information is available, identification of the resource that is assigned to or carried out a step of the workflow might be indicated in entries of workflow logs 900. Thus, if agent A was assigned to address incident INC0000003 and agent B was assigned to address incident INC0000004, an agent field in workflow log 900 may be introduced to record this information. Thus, entries 902, 904, and 908 may indicate agent A while entries 906 and 910 may indicate agent B. If different agents were involved at different points in time when addressing an incident, these different agents may be identified in the agent fields of different entries.

Workflow log 900 and resource schedule 920 have been simplified for purposes of example. In realistic scenarios, workflow log 900 might include millions of entries recorded over the course of days, months, or years. Likewise, resource schedule 920 might include availabilities of various types of resources over a similar period.

B. Phase 2

As noted above, phase 2 may involve mining workflow logs and/or resource schedules to construct graph-based representations of workflows. This may entail determining transition probabilities between workflow states. Additionally, time series analysis may be used to infer periodic or aperiodic changes in resource demand over time.

Notably, workflow graphs can be constructed from the state and transition information in workflow logs. For example, in workflow log 900, it can be inferred that the underlying workflow has new, in progress, resolved, closed, and cancelled states. It can be further inferred that there are transitions from the new state to the in progress state, from the in progress state to the resolved and cancelled states, and from the resolved state to the closed state. With a rich and detailed enough set of entries in workflow log 900, all states and transitions present in workflow 600 can be inferred.

Further, transition probabilities for transitions can be determined from entries in workflow logs. For example, assuming that there are a sufficient number of entries in workflow log 900, it may be found that work items in the new state transition to the in progress state 98% of the time, and transition to the cancelled state 2% of the time. In this manner, a workflow and its transition probabilities can be empirically derived from workflow logs, even if an explicit definition of the workflow is not available. This derived workflow and its transition probabilities can then be used as the basis for simulating performance of the workflow in various scenarios.

Furthermore, other empirical values can be derived from workflow logs, such as work item arrival rates, time spent in various states of the workflow, and total times to dispose of work items. For example, in workflow log 900, an arriving work item might be represented in an entry with an old state value of null and a new state value of new. The work item arrival rate can be calculated as the number of entries in workflow log 900 with this pattern of old and new state values per unit of time. As another example, the time spent in a state can be calculated by subtracting the timestamp of when the work item entered the state from when the work item left the state. As yet another example, the total time to dispose of a work item can be calculated by subtracting the time at which a work item arrived from when it was placed in a terminal state (e.g., closed or cancelled in workflow 600). Other possibilities exist.

In addition, a time series deconstruction of aspects of these or other values can be used. For instance, work item arrival in workflow log 900 might occur according to a complex demand cycle that takes into account general trends (increasing or decreasing), periodic changes over the course of a day, week, month, or year (e.g., to account of diurnal cycles, weekends, and/or seasonality), and aperiodic changes (e.g., holidays or other events that do not always occur on the same days of the year). General trends can be modeled using linear or non-linear regression (e.g., fitting the data in question to a first-order or second-order polynomial) and/or various types of growth models (e.g., a logistic growth model). Periodic changes can be determined by time-frequency analysis, such as by way of a Fourier transform. Aperiodic changes can be manually entered by an analyst or inferred from a holiday or event calendar.

Thus a decomposition of a time series y(t) may be represented as:

$$y(t) = g(t) + p(t) + a(t) + e(t) + c$$

Where g(t) represents trends, p(t) represents periodic changes, a(t) represents aperiodic changes, e(t) represents an error factor (e.g., to capture idiosyncratic changes that are not otherwise accommodated by the model) and c is an optional constant. For each of these functions, t represents time. Once such a model is derived, it can be used as a basis for generating or enhancing workflow logs.

C. Phase 3

As noted above, phase 3 may involve training a machine learning model from the workflow logs, transition probabilities, resource availability, time series representation, and/or other factors. In some embodiments, the machine learning model may be a form of recurrent neural network (RNN), such as a long short-term memory (LSTM) network, or a gated recurrent unit (GRU). Other possibilities exist. In general, any of these or other models may be referred to as a "prediction engine." Such a prediction engine may be trained to predict, from an input time series, an output time series that indicates behavior of one or more software applications in a specific scenario.

Nonetheless, the description below focuses on using an LSTM for enhancing workflow logs and/or generating synthetic workflow logs. Therefore, a brief description of LSTM networks is provided.

Figure 10:
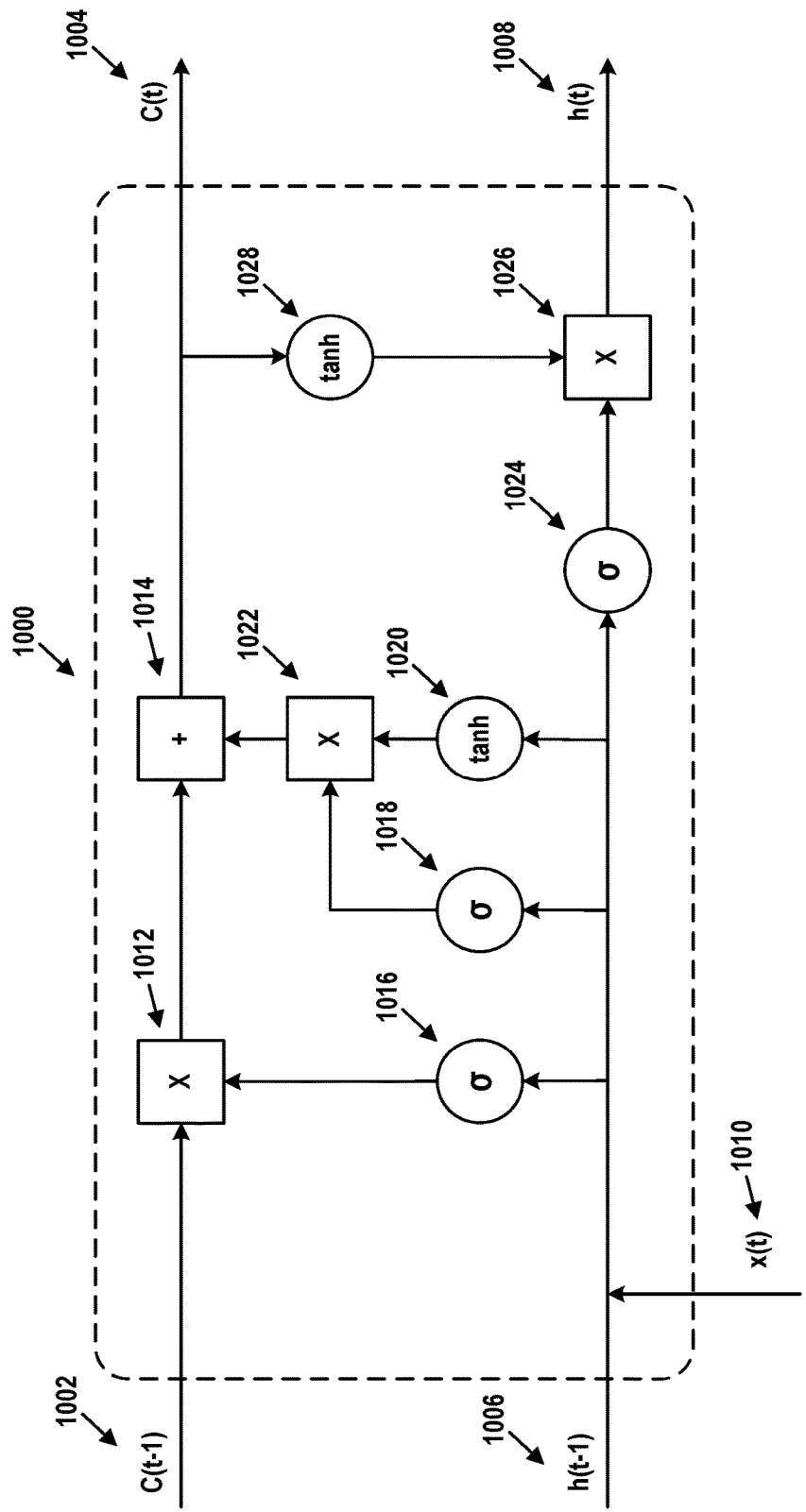
FIG. 10 depicts a cell of a long short-term memory network, in accordance with example embodiments.

LSTM networks are a form of RNN that can be used to predict values within a time series, where subsequent values have some form of dependencies on previous values. LSTMs have been used with success in modeling certain types of auto-correlated stochastic processes. For purposes of illustration and discussion, an example LSTM cell 1000 is shown in FIG. 10. Cell 1000 may be part of a larger, multi-layered LSTM network. It is assumed, for purposes of illustration and not to be limiting, that all lines represent vectors of values rather than single values.

Cell 1000 has three inputs and two outputs. Input 1002, C(t−1), represents the cell state value at time t−1, and is typically received from output of the previous cell in the network. The cell state value encodes the long-term memory of the network. Input 1006, h(t−1), represents the hidden state at time t−1, and is typically received from output of the previous cell in the network. The hidden state value encodes the short-term memory of the network. Thus, the cell state and the hidden state take on different roles. The cell state encodes an aggregation of data from all previous cells, while the hidden state encodes a characterization of the previous cell's input and cell state.

Input 1010, x(t), is the input vector to the network at time t. For example, x(t) may be the value of an input vector of a time series x(1, 2, . . . , t, . . . ) at time t. Output 1004, C(t), represents the cell state value at time t, and is typically provided to the next cell in the network. Output 1008, h(t), is the hidden state output of cell 1000, which is typically provided to the next cell in the network.

Since there may be multiple cells arranged in tandem, the next cell in the network may take outputs C(t) and h(t) as input values. The final cell in the network may use its value of h(t) as the overall output of the network. Alternatively, and not shown in FIG. 10, each cell may provide its value of h(t) as network output, thus generating an output time series. Regardless, input 1002 (the previous cell state), input 1006 (output from the previous cell), and input 1010 are all used to calculate output 1004 (an update to the cell state) and output 1008 (output of cell 1000).

C(t−1) and h(t−1) may pass through a number of functions as these values progress through cell 1000. These include sigmoid functions 1016, 1018, and 1024, tanh functions 1020 and 1028, element-wise multiplication (Hadamard) function 1012, 1022, and 1026, and element-wise addition function 1014.

A sigmoid function can be used to map arbitrary values to points between 0 and 1 on an S-shaped curve. A common example of a sigmoid function is a logistic function, which can be written as:

$$\sigma(x) = \frac{e^x}{e^x + 1}$$

A tanh (hyperbolic tangent) function can be used to map arbitrary values to points between −1 and 1 on an S-shaped curve. The tanh function can be written as:

$$\tanh(x) = \frac{e^{2x} - 1}{e^{2x} + 1}$$

Both sigmoid and tanh functions are differentiable, which facilitates backpropagation calculations. In addition, they both exhibit a limited range, which prevents output values from becoming too large or too small. But tanh functions exhibit a range centered around zero, which results in gradients being more broadly distributed. Thus, LSTM networks overcome problems that RNN's exhibit where calculations result in an increasingly smaller (vanishing) gradient as backpropagation progresses. In other words, common RNNs may lack long-term memory while LSTMs can be arranged to preserve long-term memory by way of cell state that is passed on from cell to cell.

In FIG. 10, two or more lines coming together without an explicit function shown may represent a concatenation of values represented by each of the lines. Thus, sigmoid functions 1016, 1018, and 1024 as well as tanh function 1020 take the concatenation of vectors h(t−1) and x(t) as input. Likewise, a line splitting into multiple lines means a copy of the value (i.e., the vector) represented by the line is made for each of the multiple lines.

The functions within cell 1000 may be logically grouped based on their ability to impact the cell state and output. Function 1016 may be referred to as the forget gate, functions 1018 and 1020 may be referred to as the input gate, and functions 1024, 1026, and 1028 may be referred to as the output gate. The hyperparameters (weights and biases) of these functions are learned during training.

The forget gate determines how much of inputs 1006 and 1010 should be kept or forgotten. Input is kept when the sigmoid function produces values closer to 1 or forgotten when the sigmoid function produces values closer to 0.

Function 1018 of the input gate takes inputs 1006 and 1010 and applies a sigmoid mapping to determine a relative importance of each of the values therein. Function 1020 of the input gate also takes inputs 1006 and 1010 and applies a tanh mapping to shrink their values into the manageable range of −1 and 1. The outputs of functions 1018 and 1020 are multiplied to apply the relative importances to the shrunk values.

With these calculations at hand, it is possible to update the cell state. First the cell state is multiplied by the output of the forget gate. This may result in some or all of the values of the cell state being kept or forgotten (i.e., set to 0). Then, the values of the cell state after this multiplication are added to the output of the input gate. Doing so updates the cell state to new values. The updated cell state is provided as output 1004 as well as input to function 1028.

The output gate applies sigmoid function 1024 to inputs 1006 and 1010, and also applies tanh function 1028 to the cell state. Function 1026 multiplies the outputs of functions 1024 and 1028 to determine the new hidden state, which is provided as output 1008 to the next cell in the network.

In other words (again assuming vector operations):

$$C(t) =$$
$$\sigma_f([h(t-1), x(t)]) \times C(t-1) + \sigma_i([h(t-1), x(t)]) \times \tanh_i([h(t-1), x(t)])$$

And $$h(t) = \sigma_o([h(t-1), x(t)]) \times \tanh_o(C(t))$$

Where $\sigma_f$ is function 1016, $\sigma_i$ is function 1018, $\tanh_i$ is function 1020, $\sigma_o$ is function 1024, and $\tanh_o$ is function 1028, applied with their own sets of weights and biases. As noted, these weights and biases are learned during training. Once training completes, the values of these weights and biases can be used for prediction in conjunction with the network and a further time series of input vectors.

VIII. MODEL TRAINING AND USE

Given the three phases above, an LSTM or similar model can be trained. In phase 1, workflow log and resource availability data are gathered and arranged in the form of a time series of vectors. In phase 2, this time series is optionally extended (made longer and/or extrapolated forward or backward in time) by use of time series analysis. In phase 3, the resulting time series is provided to the model for training.

An example time series 1100 is shown in FIG. 11A. Time series 1100 is essentially identical to workflow log 900, except that each entry is annotated with a set of resources that was available at the time of the entry. These annotations may be inferred from a resource calendar such as resource schedule 920.

An example vector representation of time series 1100 is shown in FIG. 11B. Format string 1110 defines an example of how the time series data within each entry can be represented as vectors. Vectors 1120 provide an example of text-based vector encoding for time series 1100. Other types of vector encoding that is in numeric or binary formats may be possible.

Notably, one or more time series formatted in accordance with format string 1110 or some other encoding may be used as training data to train an LSTM model. In some cases, this time series may include thousands to millions of entries or more. Optionally, phase 2 processing may be used to extend the time series. This can improve model quality when only a time series too short for adequate training is available.

Figure 11C:
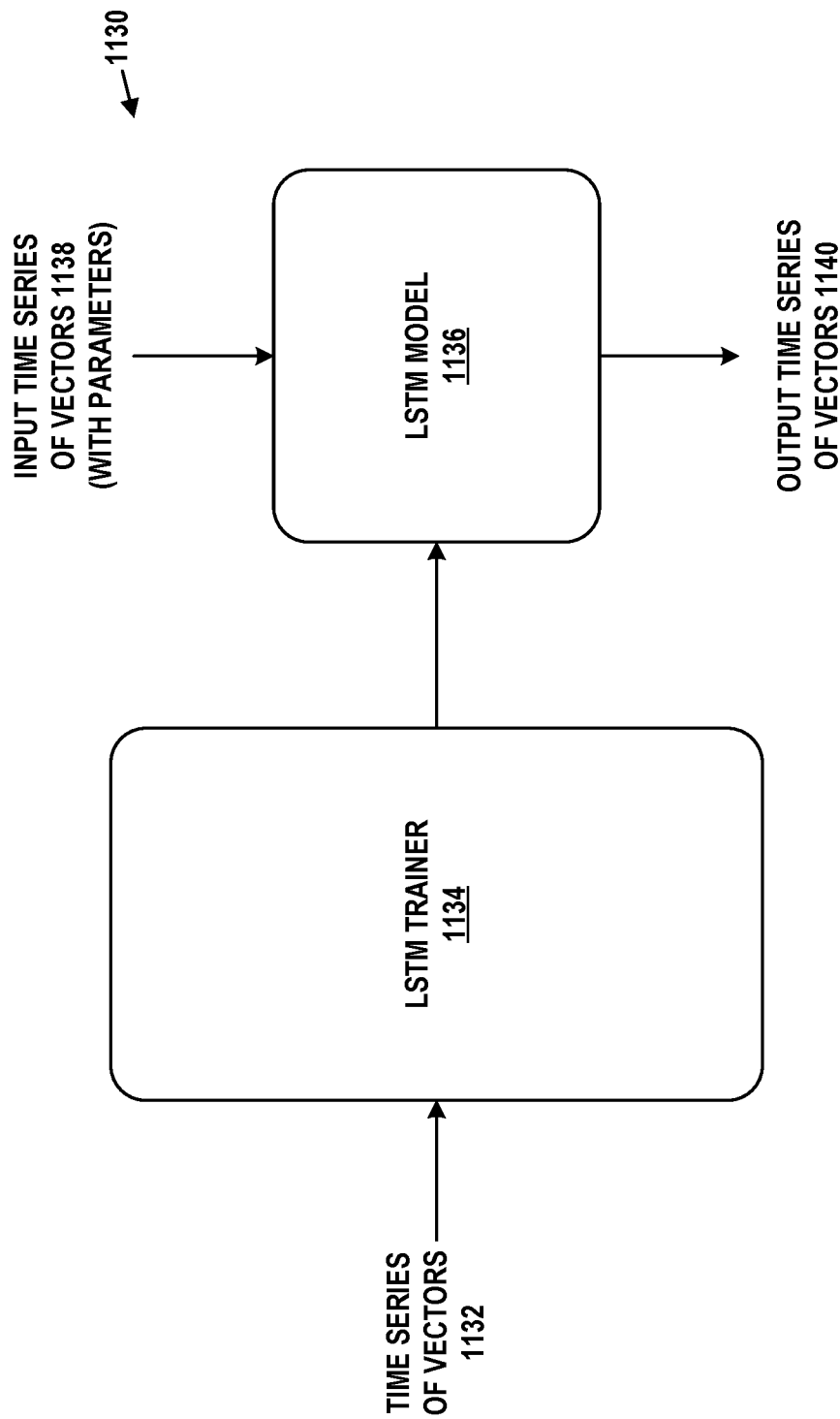
FIG. 11C depicts training and using a predictive model, in accordance with example embodiments.

FIG. 11C depicts an example of how a model can be trained and then employed to make predictions. Time series of vectors 1132 (e.g., consisting of a sequence of vectors, such as vectors 1120) may be provided to LSTM trainer 1134. LSTM trainer 1134 may be an application configured to train an LSTM network. Thus LSTM trainer 1134 may employ forward and back propagation through a preconfigured number of LSTM nodes until the weights and biases of the LSTM network converge. Depending on the size of the training data, LSTM trainer 1134 may take minutes or hours to complete its training. Further, LSTM trainer 1134 may be trained on more than one time series of vectors.

Ultimately, LSTM trainer 1134 produces LSTM model 1136. LSTM model 1136 may be a set of weights and biases that can be applied the preconfigured number of LSTM nodes. A software application can then execute this LSTM network on input time series of vectors 1138 to produce output time series of vectors 1140.

Input time series of vectors 1138 may be a time series derived from actual workflow log and resource schedule data as recorded on a computational instance, for example. This time series may be parameterized to change the number of type of resources available, increase or decrease the number of states in a workflow, change the amount of time typically spent in one or more states of the workflow, increase or decrease an error rate, or to make some other modification. These parameters may be specified by way of a graphical user interface or configuration file, for example. Thus, changing the parameters allows a user to define "what if" scenarios to test whether these changes have an impact on workflow performance.

Output time series of vectors 1140 is a predicted result of performing the workflow as parameterized. This may include data resembling a workflow log, but one that would likely be produced if the workflow operated in accordance with the parameters.

An example is shown in FIG. 11D. Input time series of vectors 1150 is based on vectors 1120, except that a third resource, agent C, has been added as an available resource. LSTM model 1136 uses input time series of vectors 1150 as parameterized and its trained weights and biases to simulate how the workflow could be carried out if there the further resource was available.

The result is output time series of vectors 1152. This output is similar to that of input time series of vectors 1150, except that incident INC0000004 was assigned to agent C. As shown in dotted oval 1154, agent C brought this incident to the cancelled state two hours faster than agent B did in the two-agent scenario. This could be because agent C is more efficient than agent B, or that adding a third agent reduces the workload of all agents to the point that some incidents can be handle significantly faster. Other possibilities exist.

IX. EXAMPLE OPERATIONS

Figure 12A:
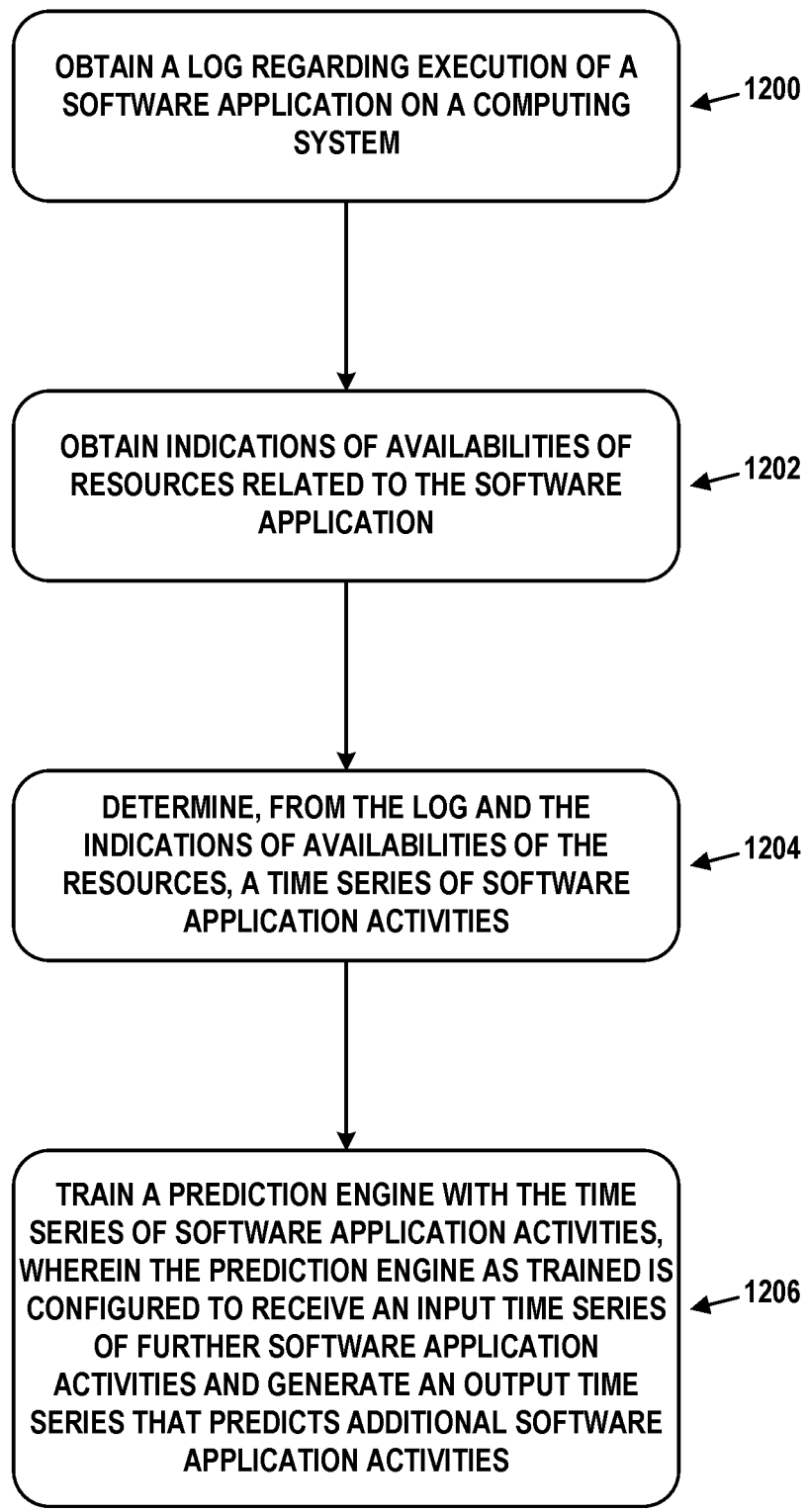
FIG. 12A is a flow chart, in accordance with example embodiments.
Figure 12B:
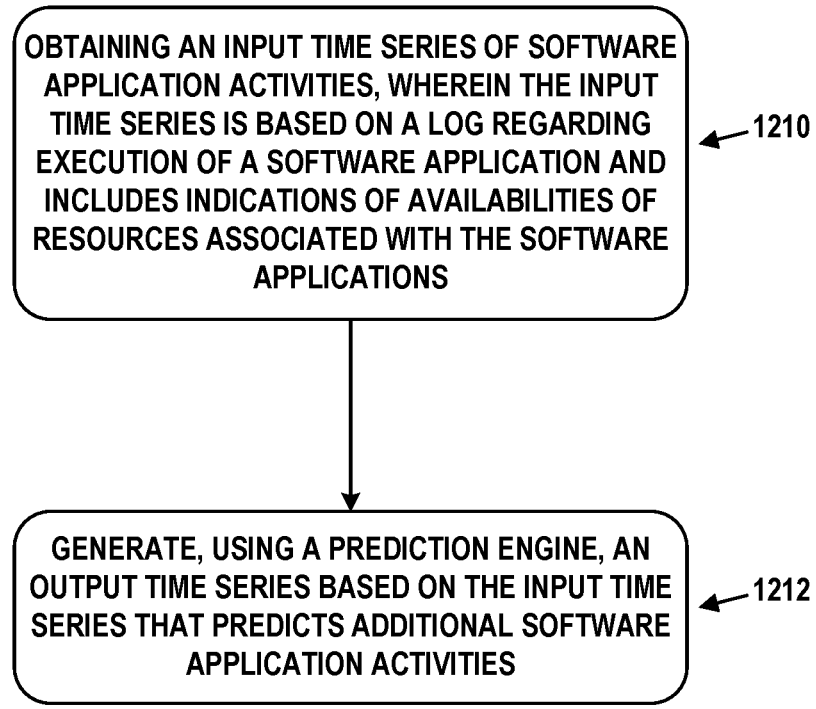
FIG. 12B is a flow chart, in accordance with example embodiments.

FIGS. 12A and 12B are flow charts illustrating example embodiments. The processes illustrated by FIGS. 12A and 12B may be carried out by a computing device, such as computing device 100, and/or a cluster of computing devices, such as server cluster 200. However, the processes can be carried out by other types of devices or device subsystems. For example, the processes could be carried out by a computational instance of a remote network management platform or a portable computer, such as a laptop or a tablet device.

The embodiments of FIGS. 12A and 12B may be simplified by the removal of any one or more of the features shown therein. Further, these embodiments may be combined with features, aspects, and/or implementations of any of the previous figures or otherwise described herein.

Block 1200 of FIG. 12A may involve obtaining a log regarding execution of a software application on a computing system. Block 1202 may involve obtaining indications of availabilities of resources related to the software application. Block 1204 may involve determining, from the log and the indications of availabilities of the resources, a time series of software application activities. Block 1206 may involve training a prediction engine with the time series of software application activities, wherein the prediction engine as trained is configured to receive an input time series of further software application activities and generate an output time series that predicts additional software application activities.

In some embodiments, the log includes data representing state changes of the software application and timestamps of when the state changes occurred.

In some embodiments, the software application executes a workflow that includes a plurality of states, and wherein the state changes are between pairs of the plurality of states.

In some embodiments, the resources are computing hardware, computing software, or human agents assigned to carry out tasks associated within at least some of the plurality of states.

In some embodiments, the indications of availabilities of the resources include a schedule of resource availability.

In some embodiments, determining the time series of software application activities comprises: decomposing an initially-determined time series into variables representing trends, periodic changes, and aperiodic changes; and using the variables to extend the initially-determined time series, by way of extrapolation, forward or backward in time.

In some embodiments, the prediction engine is based on an RNN. In some embodiments, the RNN comprises a long short-term memory model.

Block 1210 of FIG. 12B may involve obtaining an input time series of software application activities, wherein the input time series is based on a log regarding execution of a software application and includes indications of availabilities of resources associated with the software applications. Block 1212 may involve generating, using a prediction engine, an output time series based on the input time series that predicts additional software application activities.

Some embodiments may involve, before obtaining the input time series, training the prediction engine with a time series of previous software application activities, wherein the time series was generated from a previous log regarding execution of one or more software applications on a computing system and includes further indications of availabilities of further resources associated with the software applications.

In some embodiments, the prediction engine comprises an RNN.

In some embodiments, the log includes data representing state changes of the software application and timestamps of when the state changes occurred.

In some embodiments, the software application executes a workflow that includes a plurality of states, and wherein the state changes are between pairs of the plurality of states.

In some embodiments, the resources are computing hardware, computing software, or human agents assigned to carry out tasks associated with at least some of the plurality of states.

In some embodiments, the indications of availabilities of the resources include a schedule of resource availability.

X. CLOSING

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid-state drive, or another storage medium.

The computer readable medium can also include non-transitory computer readable media such as non-transitory computer readable media that store data for short periods of time like register memory and processor cache. The non-transitory computer readable media can further include non-transitory computer readable media that store program code and/or data for longer periods of time. Thus, the non-transitory computer readable media may include secondary or persistent long-term storage, like ROM, optical or magnetic disks, solid-state drives, or compact disc read only memory (CD-ROM), for example. The non-transitory computer readable media can also be any other volatile or non-volatile storage systems. A non-transitory computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments could include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A method comprising:
   obtaining a log regarding execution of a software application on a computing system;
   obtaining indications of availabilities of resources related to the software application;
   determining, from the log and the indications of availabilities of the resources, a workflow graph representing a workflow of software application activities, wherein the workflow graph includes a plurality of workflow states, transitions between workflow states in the plurality of workflow states, and transition probabilities associated with each of the transitions, wherein each workflow state corresponds to a node of the workflow graph, wherein each transition between workflow states corresponds to an edge of the workflow graph;
   determining, from the log, the workflow graph, the transition probabilities, and the indications of availabilities of the resources, a training time series of the software application activities;
   training a prediction engine comprising a long short-term memory (LSTM) machine learning model stored in a memory with the training time series of the software application activities using an LSTM trainer, wherein the LSTM trainer produces the LSTM machine learning model with a preconfigured number of cells based on the training time series of the software application activities, wherein the prediction engine as trained is configured to receive an input time series of further software application activities and generate an output time series that predicts additional software application activities;
   obtaining an altered input time series of the software application activities, wherein the altered input time series of the software application activities represents an alteration to at least one of the software application activities, the workflow, the transition probabilities, or the resources; and
   generating, using the prediction engine, a predicted output time series that predicts additional software application activities based on the altered input time series of the software application activities.

2. The method of claim 1, wherein the log includes data representing state changes of the software application and timestamps of when the state changes occurred.

3. The method of claim 2, wherein the software application executes the workflow that includes a plurality of states, and wherein the state changes are between pairs of the plurality of states.

4. The method of claim 3, wherein the resources are computing hardware, computing software, or human agents assigned to carry out tasks associated with at least some of the plurality of states.

5. The method of claim 1, wherein the indications of availabilities of the resources include a schedule of resource availability.

6. The method of claim 1, wherein the determining the training time series of software application activities comprises:
   decomposing an initially-determined time series into variables representing trends, periodic changes, and aperiodic changes; and
   using the variables to extend the initially-determined time series, by way of extrapolation, forward or backward in time.

7. A non-transitory computer-readable medium storing program instructions that, when executed by one or more processors of a computing system, cause the computing system to perform operations comprising:
   obtaining a log regarding execution of a software application;
   obtaining indications of availabilities of resources related to the software application;
   determining, from the log and the indications of availabilities of the resources, a workflow graph representing a workflow of software application activities, wherein the workflow graph includes a plurality of workflow states, transitions between workflow states in the plurality of workflow states, and transition probabilities associated with each of the transitions, wherein each workflow state corresponds to a node of the workflow graph, wherein each transition between workflow states corresponds to an edge of the workflow graph;
   determining, from the log, the workflow graph, the transition probabilities, and the indications of availabilities of the resources, a training time series of the software application activities;
   training a prediction engine comprising a long short-term memory (LSTM) machine learning model stored in a memory with the training time series of the software application activities using an LSTM trainer, wherein the LSTM trainer produces the LSTM machine learning model with a preconfigured number of cells based on the training time series of the software application activities, wherein the prediction engine as trained is configured to receive an input time series of further software application activities and generate an output time series that predicts additional software application activities;
   obtaining an altered input time series of the software application activities, wherein the altered input time series of the software application activities represents an alteration to at least one of the software application activities, the workflow, the transition probabilities, or the resources; and
   generating, using the prediction engine, a predicted output time series that predicts additional software application activities based on the altered input time series of the software application activities.

8. The non-transitory computer-readable medium of claim 7, wherein the log includes data representing state changes of the software application and timestamps of when the state changes occurred.

9. The non-transitory computer-readable medium of claim 8, wherein the software application executes the workflow that includes a plurality of states, and wherein the state changes are between pairs of the plurality of states.

10. The non-transitory computer-readable medium of claim 7, wherein the indications of availabilities of the resources include a schedule of resource availability.

11. The non-transitory computer-readable medium of claim 7, wherein the determining the training time series of software application activities comprises:
- decomposing an initially-determined time series into variables representing trends, periodic changes, and aperiodic changes; and
- using the variables to extend the initially-determined time series, by way of extrapolation, forward or backward in time.

12. The non-transitory computer-readable medium of claim 9, wherein the resources are computing hardware, computing software, or human agents assigned to carry out tasks associated with at least some of the plurality of states.

13. A system comprising:
- one or more processors; and
- memory, containing program instructions that, upon execution by the one or more processors, cause the system to perform operations comprising:
  - obtaining a log regarding execution of a software application;
  - obtaining indications of availabilities of resources related to the software application;
  - determining, from the log and the indications of availabilities of the resources, a workflow graph representing a workflow of software application activities, wherein the workflow graph includes a plurality of workflow states, transitions between workflow states in the plurality of workflow states, and transition probabilities associated with each of the transitions, wherein each workflow state corresponds to a node of the workflow graph, wherein each transition between workflow states corresponds to an edge of the workflow graph;
  - determining, from the log, the workflow graph, the transition probabilities, and the indications of availabilities of the resources, a training time series of the software application activities;
  - training a prediction engine comprising a long short-term memory (LSTM) machine learning model stored in a memory with the training time series of the software application activities using an LSTM trainer, wherein the LSTM trainer produces the LSTM machine learning model with a preconfigured number of cells based on the training time series of the software application activities, wherein the prediction engine as trained is configured to receive an input time series of further software application activities and generate an output time series that predicts additional software application activities;
  - obtaining an altered input time series of the software application activities, wherein the altered input time series of the software application activities represents an alteration to at least one of the software application activities, the workflow, the transition probabilities, or the resources; and
  - generating, using the prediction engine, a predicted output time series that predicts additional software application activities based on the altered input time series of the software application activities.

14. The system of claim 13, wherein the log includes data representing state changes of the software application and timestamps of when the state changes occurred.

15. The system of claim 14, wherein the software application executes the workflow that includes a plurality of states, and wherein the state changes are between pairs of the plurality of states.

16. The system of claim 15, wherein the resources are computing hardware, computing software, or human agents assigned to carry out tasks associated with at least some of the plurality of states.

17. The system of claim 13, wherein the indications of availabilities of the resources include a schedule of resource availability.

18. The system of claim 13, wherein the determining the training time series of software application activities comprises:
- decomposing an initially-determined time series into variables representing trends, periodic changes, and aperiodic changes; and
- using the variables to extend the initially-determined time series, by way of extrapolation, forward or backward in time.

* * * * *